US010965519B2

(12) United States Patent
Nambiar et al.

(10) Patent No.: US 10,965,519 B2
(45) Date of Patent: Mar. 30, 2021

(54) EXACTLY-ONCE TRANSACTION SEMANTICS FOR FAULT TOLERANT FPGA BASED TRANSACTION SYSTEMS

(71) Applicant: Tata Consultancy Services Limited, Mumbai (IN)

(72) Inventors: Manoj Karunakaran Nambiar, Mumbai (IN); Swapnil Rodi, Mumbai (IN); Sunil Anant Puranik, Pune (IN); Mahesh Damodar Barve, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 302 days.

(21) Appl. No.: 16/283,242

(22) Filed: Feb. 22, 2019

(65) Prior Publication Data
US 2019/0296964 A1   Sep. 26, 2019

(30) Foreign Application Priority Data

Mar. 22, 2018   (IN) .............................. 201821010571

(51) Int. Cl.
*H04L 12/24* (2006.01)
*G06F 11/20* (2006.01)
(Continued)

(52) U.S. Cl.
CPC ...... *H04L 41/0654* (2013.01); *G06F 11/0757* (2013.01); *G06F 11/2007* (2013.01);
(Continued)

(58) Field of Classification Search
CPC .................................................. H04L 41/0654
See application file for complete search history.

(56) References Cited

U.S. PATENT DOCUMENTS 5,978,933 A   11/1999  Wyld et al.
6,182,086 B1   1/2001  Lomet et al.
(Continued)

FOREIGN PATENT DOCUMENTS

EP   1 110 148 B1   7/2002

OTHER PUBLICATIONS

A. Thomson et al., "Building Deterministic Transaction Processing Systems without Deterministic Thread Scheduling", Proceedings of the 2nd Workshop on Determinism and Correctness in Parallel Programming, 5 pages, http://cs.yale.edu/homes/thomson/publications/transactions-wodet11.pdf, Feb. 2011.

*Primary Examiner* — Jason E Mattis
(74) *Attorney, Agent, or Firm* — Finnegan, Henderson, Farabow, Garrrett & Dunner, LLP

(57) ABSTRACT

This disclosure relates generally to methods and systems for providing exactly-once transaction semantics for fault tolerant FPGA based transaction systems. The systems comprise middleware components in a server as well as client end. The server comprises Hosts and FPGAs. The FPGAs control transaction execution (the application processing logic also resides in the FPGA) and provide fault tolerance with high performance by means of a modified TCP implementation. The Hosts buffer and persist transaction records for failure recovery and achieving exactly-once transaction semantics. The monitoring and fault detecting components are distributed across the FPGA's and Hosts. Exactly-once transaction semantics is implemented without sacrificing performance by switching between a high performance mode and a conservative mode depending on component failures. PCIE switches for connectivity between FPGAs and Hosts ensure FPGAs are available even if Hosts fail. When FPGA's provide higher processing elements and memory, the Hosts may be eliminated.

17 Claims, 24 Drawing Sheets

(51) Int. Cl.
    *H04L 12/26*     (2006.01)
    *H04L 29/08*     (2006.01)
    *H04L 29/06*     (2006.01)
    *G06F 11/07*     (2006.01)
    *G06F 16/245*     (2019.01)
    *H04L 29/14*     (2006.01)

(52) U.S. Cl.
    CPC .... *G06F 16/24569* (2019.01); *H04L 43/0817* (2013.01); *H04L 43/106* (2013.01); *H04L 67/327* (2013.01); *H04L 69/161* (2013.01); *H04L 69/163* (2013.01); *H04L 69/28* (2013.01); *H04L 69/40* (2013.01); *G06F 2201/805* (2013.01)

(56) References Cited

U.S. PATENT DOCUMENTS

| | | | |
|---|---|---|---|
| 8,365,016 B2 | 1/2013 | Gray et al. | |
| 9,077,554 B1 | 7/2015 | Szabo | |
| 2011/0211441 A1* | 9/2011 | Matityahu | H04L 43/10 370/217 |
| 2012/0210416 A1* | 8/2012 | Mihelich | H04L 67/1004 726/11 |
| 2016/0308718 A1* | 10/2016 | Lanka | G06F 15/7871 |
| 2018/0254915 A1* | 9/2018 | Sosnowski | H04L 12/1872 |
| 2018/0276751 A1* | 9/2018 | Kavanagh | H04L 69/16 |
| 2020/0068048 A1* | 2/2020 | Hermesh | H04L 29/06095 |

\* cited by examiner

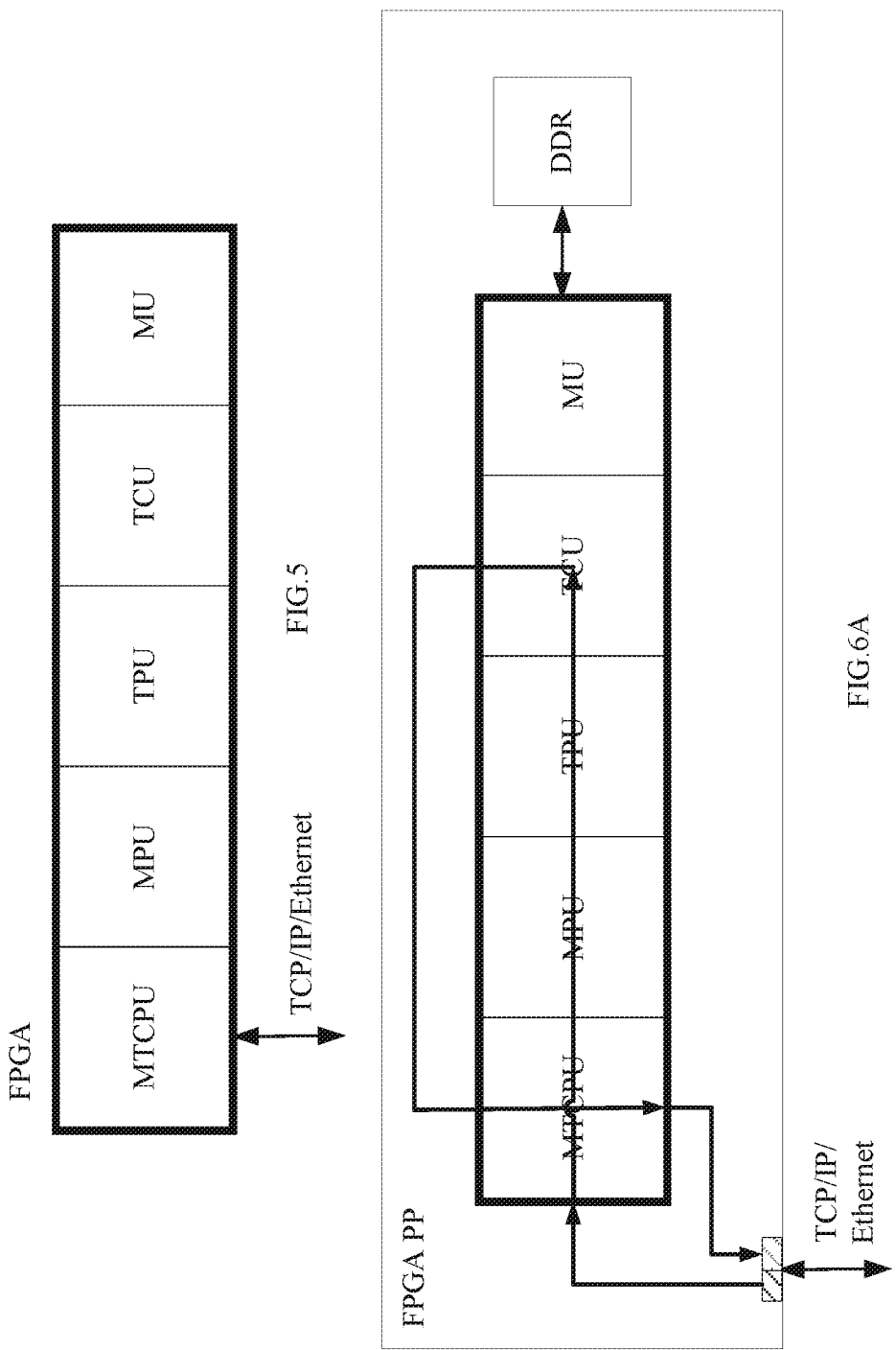

EXACTLY-ONCE TRANSACTION SEMANTICS FOR FAULT TOLERANT FPGA BASED TRANSACTION SYSTEMS

PRIORITY CLAIM

This U.S. patent application claims priority under 35 U.S.C. § 119 to: Indian Patent Application No. 201821010571 filed on 22 Mar. 2018. The entire contents of the aforementioned application are incorporated herein by reference.

TECHNICAL FIELD

The disclosure herein generally relates to transaction systems, and, more particularly, to a framework that provides exactly-once transaction semantics for fault tolerant Field Programmable Gate Array (FPGA) based transaction systems.

BACKGROUND

Transactional applications are expected to respond to incoming messages from clients or message sources. Database server systems are a prime example of transaction processing. While database servers have been evolving in their internal implementations (row based to column based, custom data structures, key-value stores) and even technology (disk based storage to in-memory storage), so have their applications. From purely client-server systems to multi-tier to real-time streaming analytics—all these applications need to transact with the database servers. Regardless of how applications evolve, the need for transactional database remains. And while applications evolve there may be many classes of applications which require speed of processing, high throughput, high availability while processing transactions exactly-once no matter how many components fail, regardless of the sequence of failure events. As the applications themselves get complex having a framework that provides for these features simplifies the design of these applications thereby enabling high performance.

SUMMARY

Embodiments of the present disclosure present technological improvements as solutions to one or more of the above-mentioned technical problems recognized by the inventors in conventional systems.

In an aspect, there is provided a Field Programmable Gate Array (FPGA) based transaction system comprising: a plurality of FPGAs including an active FPGA and remaining passive FPGAs, each of the plurality of FPGAs being configured to cooperate with a plurality of Hosts and at least one client, the plurality of FPGAs being connected to the at least one client via a Transmission Control Protocol (TCP) connection, each of the plurality of FPGAs having a volatile memory. In an embodiment the plurality of FPGAs comprise: a Modified Transmission Control Protocol Unit (MTCPU) configured to: receive TCP packets corresponding to incoming requests, by the MTCPU of the active FPGA, from the at least one client; append the TOP packets, with at least a time-stamp as a non-deterministic parameter; publish the TOP packets, by the MTCPU of the active FPGA, to the passive FPGAs, and thereafter transmit a TCP acknowledgement of the incoming requests to the at least one client after an internal acknowledgement of receipt of the TCP packets by the passive FPGAs; control, by the MTCPU of the active FPGA, scheduling of the incoming requests along with resubmitted requests caused by concurrent execution by an application after a configurable delay, wherein the resubmitted requests are prioritized over the incoming requests; and optimize performance by preparing TCP packets corresponding to (a) a response or (b) the response and one or more notifications and transmitting the prepared TCP packets to the at least one client upon receipt of an internal acknowledgement from the plurality of Hosts; a Message Parsing Unit (MPU) configured to: detect, by the MPU of the active FPGA, duplicate requests received based on associated request identifiers; retrieve, by the MPU of the active FPGA, the resubmitted requests based on an associated client identifier and an associated request identifier; and parse and convert the TCP packets received in a sequence from the MTCPU into a message format associated with a network between the at least one client and the plurality of FPGAs and the plurality of Hosts and transmit the incoming requests in the message format in the sequence; a Transaction Processing Unit (TPU) configured to: host the application which processes the incoming requests or the resubmitted requests from the MPU and generates (a) the response or (b) the response and the one or more notifications associated thereof; and receive the resubmitted requests caused by the concurrent execution from the application and send to the MTCPU for scheduling via the MPU; a Transaction Commit Unit (TCU) configured to: receive (a) the response or (b) the response and the one or more notifications from the TPU; generate messages comprising the incoming requests or the resubmitted requests and (a) the response or (b) the response and the one or more notifications; and transmit the messages to (i) the plurality of Hosts for performing at least one of commit and transmit to the at least one client and (ii) the MTCPU for optimizing the performance, wherein the prepared TCP packets constitute (a) at least a portion of a message or (b) one or more of the messages; and a Monitoring Unit (MU) configured to: monitor and initiate an FPGA failover process in the event an active FPGA failure is detected.

In another aspect, there is provided a method comprising: establishing a Transmission Control Protocol (TCP) connection from at least one client to each Field Programmable Gate Array (FPGA) and each Host in an FPGA based transaction system comprising a plurality of FPGAs, a plurality of Hosts and at least one client with messages transmitted therebetween, wherein each of the messages comprise an incoming request from the at least one client and (a) a response or (b) the response and one or more notifications associated thereof, to the at least one client, and wherein an incoming request and a corresponding response represents a transaction; switching a mode of operation of the FPGA based transaction system between a high performance mode of operation and a conservative mode of operation based on a pre-configured mode switching threshold depending on number of available Hosts in the plurality of Hosts, wherein (i) the high performance mode involves saving the messages in a volatile memory associated with each of the plurality of Hosts and thereafter transmitting an internal acknowledgement thereof to a corresponding FPGA in the plurality of FPGAs, and (ii) the conservative mode involves saving the messages in a non-volatile memory associated with each of the plurality of Hosts and thereafter transmitting an internal acknowledgement thereof to a corresponding FPGA in the plurality of FPGAs; saving the messages from the volatile memory into the non-volatile memory of the plurality of Hosts during a switching period when the high performance mode of operation switches to a
} conservative mode of operation; delaying transmitting of (a) the response or (b) the response and the one or more notifications to the at least one client, till the end of saving of the associated messages into the non-volatile memory during the switching period or based on a pre-configured time delay to ensure an incoming request is received by the plurality of Hosts instead of an associated duplicate request that reaches the plurality of Hosts prior to the incoming request; and delaying transmitting of the internal acknowledgement to the plurality of FPGAs, till the end of saving of the associated messages into the non-volatile memory.

In an embodiment, the volatile and non-volatile memory of the plurality of Hosts are implemented as a key-value store and wherein each of the incoming requests is tagged with a client identifier and a request identifier, wherein the request identifier is a unique sequence number incremented for every subsequent incoming request by a middleware associated with the at least one client; a corresponding response is tagged with the request identifier; an incoming request and a corresponding response represent a transaction; and a notification corresponding to the incoming request is tagged with a notification identifier comprising the associated client identifier, the associated request identifier and a sequence number of the notification within the transaction.

In an embodiment, the method described above further comprises detecting, by the plurality of FPGAs, all duplicate requests from the at least one client by: appending a list of request identifiers, in each of the plurality of FPGAs, associated with incoming requests being processed in the plurality of FPGAs for every incoming request not available in the list and if the associated sequence number is greater than a maximum sequence number received from the corresponding client; discarding an incoming request if an associated request identifier is available in the list; obtaining, from an application, the at least one of (a) a response or (b) one or more notifications corresponding to the incoming request if an associated request identifier is not available in the list; transmitting, to the plurality of Hosts, (a) the response or (b) the response and the one or more notifications and deleting an associated request identifier from the list; storing a message comprising the incoming requests or the resubmitted request along with (a) the response or (b) the response and the one or more notifications associated thereof in an appropriate key-value store in the plurality of Hosts depending on the mode of operation; transmitting (a) the response or (b) the response and the one or more notifications from either the volatile or the non-volatile memory of the plurality of Hosts to the at least one client, if an associated request identifier is not available in the list of request identifiers and if the associated sequence number is less than the maximum sequence number received from the corresponding client, thereby detecting, by the plurality of FPGAs, the incoming request as a duplicate request; and deleting the message from the volatile memory and saving in the non-volatile memory of the plurality of Hosts upon receipt of an acknowledgement pertaining to consuming (a) the response or (b) the response and the one or more notifications by a corresponding client.

In an embodiment, the method described above further comprises transmitting the one or more notifications to the at least one client with exactly-once semantics by retransmitting the one or more notifications if an acknowledgement pertaining to receipt of the notification is not received within a pre-configured time from the at least one client.

In an embodiment, the method described above further comprises providing deterministic execution of each transaction by: appending TCP packets corresponding to the incoming requests, with at least a time-stamp as a non-deterministic parameter, wherein the TCP packets constitute (a) at least a portion of a message or (b) one or more of the messages; publishing the TCP packets, by the active FPGA, to the passive FPGAs, and thereafter transmitting an TCP acknowledgment of the incoming requests to the at least one client after internal acknowledgement of receipt of the TCP packets by the passive FPGAs; receiving the resubmitted requests, in the active FPGA, caused by concurrent execution by an application; publishing, by the active FPGA, only the request identifiers with the non-deterministic parameter for the resubmitted requests to the passive FPGAs; storing the resubmitted requests as a key-value store in the volatile memory of the plurality of FPGAs; and scheduling execution of the incoming requests along with the resubmitted requests after a configurable delay by prioritizing the resubmitted requests over the incoming requests, in the active FPGA.

In an embodiment, the method described above further comprises providing high availability for the transaction system by: identifying one of the plurality of FPGAs as an active FPGA and one of the plurality of Hosts as an active Host, remaining FPGAs from the plurality of FPGAs and remaining Hosts from the plurality of Hosts being identified as passive FPGAs and passive Hosts respectively to achieve redundancy; initiating heartbeat requests, by the active FPGA, to each of the passive FPGAs and the plurality of Hosts in the absence of internal messages between the plurality of Hosts and the plurality of FPGAs within a preset heartbeat threshold that otherwise serve as a heartbeat indicating live FPGAs and live Hosts within the plurality of FPGAs and the plurality of Hosts respectively; initiating heartbeat requests, by the active Host serving as a monitoring server, to the passive Hosts and the passive FPGAs; broadcasting, by the monitoring server, a list of the live FPGAs and the live Hosts to each of the plurality of FPGAs and each of the plurality of Hosts based on a status of the heartbeat requests; initiating an FPGA failover process to a next passive FPGA in the event that (i) the at least one client triggers the FPGA failover process via the passive FPGAs or (ii) a heartbeat request is not received by the monitoring server within the pre-set heartbeat threshold from the active FPGA indicating failure thereof, wherein the next passive FPGA from a pre-determined sequence of the plurality of FPGAs and that is broadcasted in the list of live FPGAs and live Hosts is identified as the next active FPGA; initiating a Host failover process, by a passive Host from a pre-determined sequence of the plurality of Hosts, in the event that any of the passive Hosts do not receive a heartbeat request within the pre-set heartbeat threshold from the active Host indicating failure thereof, and further identifying the passive Host from the pre-determined sequence of the plurality of Hosts and that is broadcasted in the list of live FPGAs and live Hosts as the next active Host; broadcasting, by the active FPGA or the monitoring server, the next active FPGA or the next active Host to each of the live FPGAs, the live Hosts and the at least one client after completion of the FPGA failover process or the Host failover process respectively; and terminating wait for an internal acknowledgement or the messages pertaining to failure of additional Hosts and FPGAs based on the list of live hosts and live FPGAs sent by the monitoring server, determined using heartbeats.

In an embodiment, the method described above further comprises maintaining consistent states across the plurality of FPGAs and the plurality of Hosts during active FPGA failover (320) by performing one or more of: parsing all the TCP packets received from the active FPGA by the plurality of FPGAs; discarding incomplete messages by the plurality of FPGAs; comparing the number of TCP packets received by the passive FPGAs and the active FPGA and copying missing TCP packets from the active FPGA to the passive FPGAs; and processing the resubmitted messages in the plurality of FPGAs.

In yet another aspect, there is provided a Field Programmable Gate Array (FPGA) based transaction system (without the Hosts) comprising: a plurality of FPGAs including an active FPGA and remaining passive FPGAs, each of the plurality of FPGAs being configured to cooperate with at least one client via a Transmission Control Protocol (TCP) connection, each of the plurality of FPGAs having one or more storage devices being a combination of a volatile memory and a non-volatile memory and implemented as a key-value store, the plurality of FPGAs comprising: a Modified Transmission Control Protocol Unit (MTCPU) configured to: receive TCP packets corresponding to incoming requests, by the MTCPU of the active FPGA, from the at least one client; append the TCP packets, with at least a time-stamp as a non-deterministic parameter; publish the TCP packets, by the MTCPU of the active FPGA, to the passive FPGAs, and thereafter transmit a TCP acknowledgement of the incoming requests to the at least one client; control, by the MTCPU of the active FPGA, scheduling of the incoming requests along with resubmitted requests caused by concurrent execution by an application after a configurable delay, wherein the resubmitted requests are prioritized over the incoming requests; and transmitting (a) a response or (b) the response and one or more notifications to the at least one client; a Message Parsing Unit (MPU) configured to: detect, by the MPU of the active FPGA, duplicate requests received based on associated request identifiers; retrieve, by the MPU of the active FPGA, the resubmitted requests based on an associated client identifier and an associated request identifier; and parse and convert the TCP packets received in a sequence from the MTCPU into a message format associated with a network between the at least one client and the plurality of FPGAs; a Transaction Processing Unit (TPU) configured to: host the application which processes the incoming requests or the resubmitted requests from the MPU and generates (a) the response or (b) the response and the one or more notifications; and receive the resubmitted requests caused by the concurrent execution from the application and send to the MTCPU for scheduling via the MPU; a Transaction Commit Unit (TCU) configured to: receive (a) the response or (b) the response and the one or more notifications sent from the TPU; generate messages comprising the incoming requests or the resubmitted requests and (a) the response or (b) the response and the one or more notifications, wherein the TCP packets constitute (a) at least a portion of a message or (b) one or more of the messages; and transmit the messages to the MTCPU; and a Monitoring Unit (MU) configured to: monitor and initiate an FPGA failover process in the event an active FPGA failure is detected.

In an embodiment, in the FPGA based transaction system (without the Hosts), the plurality of FPGAs are further configured to: switch a mode of operation of the FPGA based transaction system between a high performance mode of operation and a conservative mode of operation based on a pre-configured mode switching threshold depending on number of available FPGAs in the plurality of FPGAs, wherein (i) the high performance mode involves saving the messages in the volatile memory associated with each of the plurality of FPGAs and thereafter transmitting a TCP acknowledgement to the at least one client, and (ii) the conservative mode involves saving the messages in the non-volatile memory associated with each of the plurality of FPGAs and thereafter transmitting a TCP acknowledgement to the at least one client; save the messages from the volatile memory into the non-volatile memory during a switching period when the high performance mode of operation switches to a conservative mode of operation; and delay transmit of (a) the response or (b) the response and the one or more notifications to the at least one client, till the end of saving of the messages into the non-volatile memory.

In an embodiment, in the FPGA based transaction system (without the Hosts), each of the incoming requests is tagged with a client identifier and a request identifier, wherein the request identifier is a unique sequence number incremented for every subsequent incoming request by a middleware associated with the at least one client; wherein a corresponding response is tagged with the request identifier; wherein an incoming request and a corresponding response represent a transaction; and wherein a notification corresponding to the incoming request is tagged with a notification identifier comprising the associated client identifier, the associated request identifier and a sequence number of the notification within the transaction.

In an embodiment, in the FPGA based transaction system (without the Hosts), the MU, comprised in the active FPGA serving as a monitoring server, is configured to initiate heartbeat requests to the passive FPGAs in the absence of internal messages between the passive FPGAs and the active FPGA within a preset heartbeat threshold that otherwise serve as heartbeats indicating live FPGAs within the plurality of FPGAs, the MU comprised in the active FPGA is further configured to broadcast a list of the live FPGAs to each of the plurality of FPGAs; and wherein the MU comprised in each of the passive FGPAs is configured to initiate an FPGA failover process to convert itself into an active FPGA if (i) any of the passive FPGAs do not receive the heartbeat request from the active FPGA within the preset heartbeat threshold indicating failure thereof, wherein a passive FPGA from a pre-determined sequence of the plurality of FPGAs and that is broadcasted in the list of live FPGAs is identified as the next active FPGA or (ii) the at least one client triggers the FPGA failover process via the passive FPGAs.

In an embodiment, in the FPGA based transaction system (without the Hosts), the plurality of FPGAs are connected over either (i) a Peripheral Component Interconnect Express (PCIE) network, (ii) a combination of PCIE and Infiniband network, or (iii) a combination of Remote Direct Memory Access (RDMA) over Converged Ethernet (RoCE) network and Infiniband network.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 5 is an exemplary microarchitecture of the FPGA constituting the FPGA based transaction system of FIG. 2A, in accordance with an embodiment of the present disclosure.

FIG. 6A is an exemplary sequence of processing a message for a transaction that did not need to be resubmitted, within an active FPGA, in accordance with an embodiment of the present disclosure.

DETAILED DESCRIPTION OF EMBODIMENTS

Figure 1:
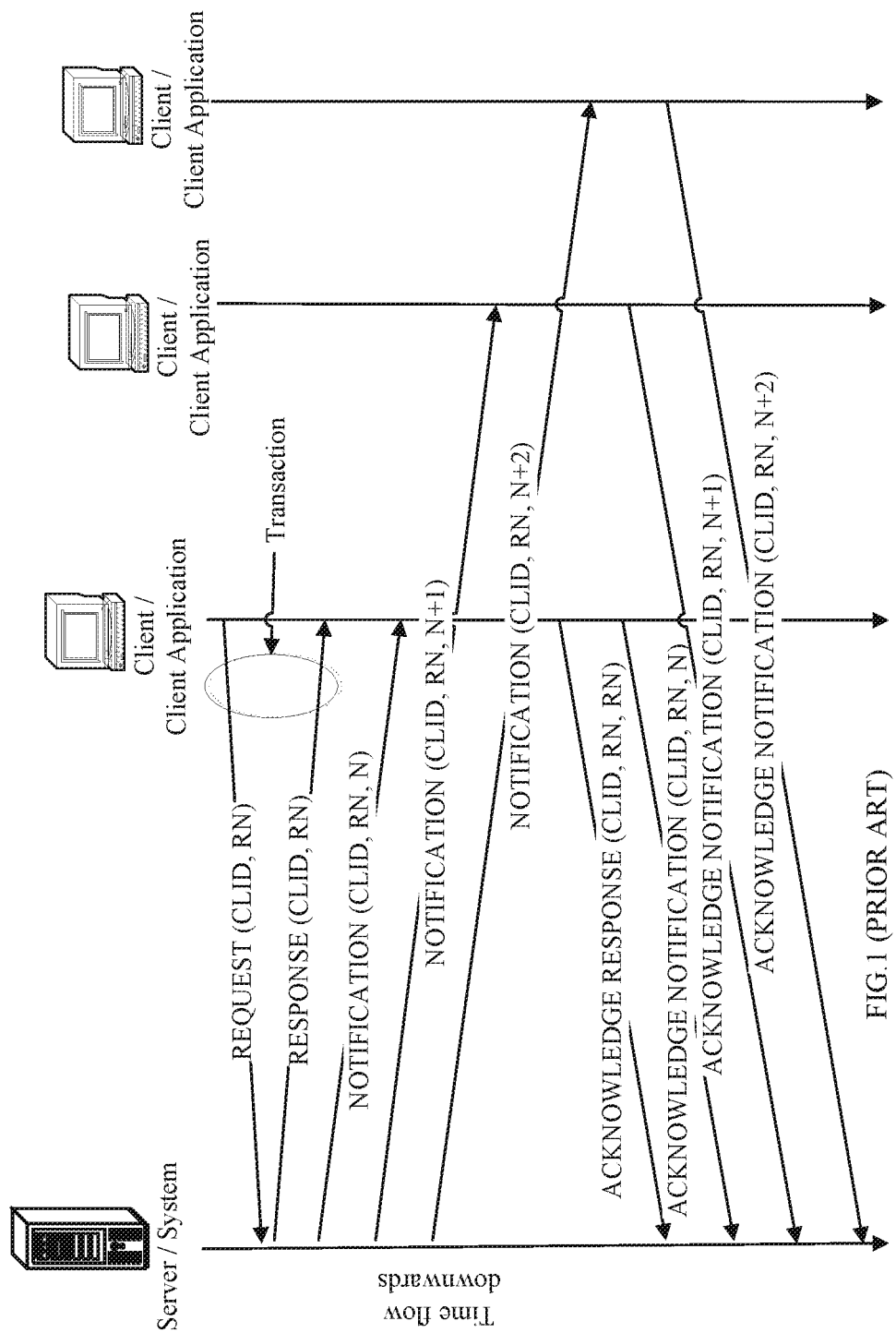
FIG. 1 illustrates an exchange of messages between a server and a plurality of clients as known in the art.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

With the current state of the art, it is difficult to achieve low latency and high throughput exceeding millions of messages per second, while achieving high availability in the face of possible faults. Fault tolerance checks and controls can limit performance. Engineering efforts required for building applications on Field Programmable Gate Arrays (FPGAs) is high and having application developer's focus on non-functional issues adds in time leading to market delays and make applications complex. Typical transactional applications are traditional order processing online systems, order matching applications for stock exchange trading, real time streaming analytics, Internet of things (Iot) applications, real time recommendation systems, and the like.

The present disclosure provides a transactional framework using FPGAs that can deliver fault tolerance and exactly-once messaging semantics, without hampering performance. The framework may reduce application development time significantly as developers no longer have to build fault tolerance and exactly-once features. They just have to ensure that the application processing is high performing.

Clients usually connect over Transmission Control Protocol/Internet Protocol (TCP/IP). Such systems may have multiple tiers—for example, a front ending tier, which multiplex client connections, and a back end tier, which hosts databases. The backend systems are server systems. The server systems includes any server which is stateful and requires that the state of the server be maintained forever—which means it should never be lost for the application to continue any meaningful operation. The clients themselves may not be real users but high frequency trading engines, which place orders to utilize a sub second trading opportunity. This means that the system has to be responding to transactions with low latencies. At the same time there may be thousands of such co-located clients connected placing orders—in other words they have to support high throughput of transactions. More important is that there should be no downtime, ideally during market hours—downtime in these scenarios can translate to millions of dollars of lost business.

The servers typically have a standard Transmission Control Protocol (TCP) interface. It is thus essential that the servers respond fast, in the order of microseconds for large burst of incoming requests of the order of million orders per second. The servers need to be fault tolerant or provide high availability in view of failure of a component. The servers need to ensure that no messages are lost and there should be no duplicate messages especially in case of component failovers during failures. Other features needed on the server include tolerance to client failures, supporting exactly-once transaction semantics and supporting queries of prior transactions and messages by clients.

FIG. 1 illustrates an exchange of messages between a server and a plurality of clients as known in the art. A transaction system is expected to generate a response to each incoming request. The response need not be synchronous, i.e. clients may send requests one after the other to the server and the server may send responses back to the clients identifying the requests being responded to, in any order. A pair of incoming request and corresponding response message may be termed as a transaction. The incoming request may also be referred as an incoming message or order. As part of processing of the incoming request, apart from generating a response, there may be additional processing that generates notifications or alerts for one or more clients. Notifications may appear asynchronous with regard to transaction processing but it is always a result of transaction processing. An incoming request from a client need not always result into a notification—it may happen as a result of a request from another client in which case it appears delayed (unrelated to a request message) for the first client. Notifications may be sent to any client and is determined by the application semantics. Although FIG. 1 may imply that a client waits for a response to a request before sending a next request, the client may actually send the next request without waiting for a response. In that sense, requests and responses are also asynchronous.

Transactions and notifications are identified through their sequence numbers. A client middleware may generate a request identifier (RN) being a unique sequence number as shown in FIG. 1 The request identifier (RN) for an incoming request is incremented for every subsequent request sent by the client. A client identifier (CLID) and the request identifier (RN), uniquely identify a request in a transaction system. The server tags the response with the same sequence number (RN) as that of the incoming request—thus making it possible to identify a transaction. Every notification sent to a client is tagged with a unique identifier. This notification identifier is unique to a client. The same notification for another client could have a different identifier uniquely identifying the sequence number for that client. A notification identifier comprises the client identifier (CLID), the request identifier (RN) associated with a triggering request and the sequence of the notification within the transaction (N, N+1, N+2, etc.). After a client application processes the response, it acknowledges the response or notification back to the server. The system may than release resources (memory/storage) it allocates to the transaction.

Referring now to the drawings, and more particularly to FIGS. 2 through 9B, where similar reference characters denote corresponding features consistently throughout the figures, there are shown preferred embodiments and these embodiments are described in the context of the following exemplary system and method.

Figure 2A:
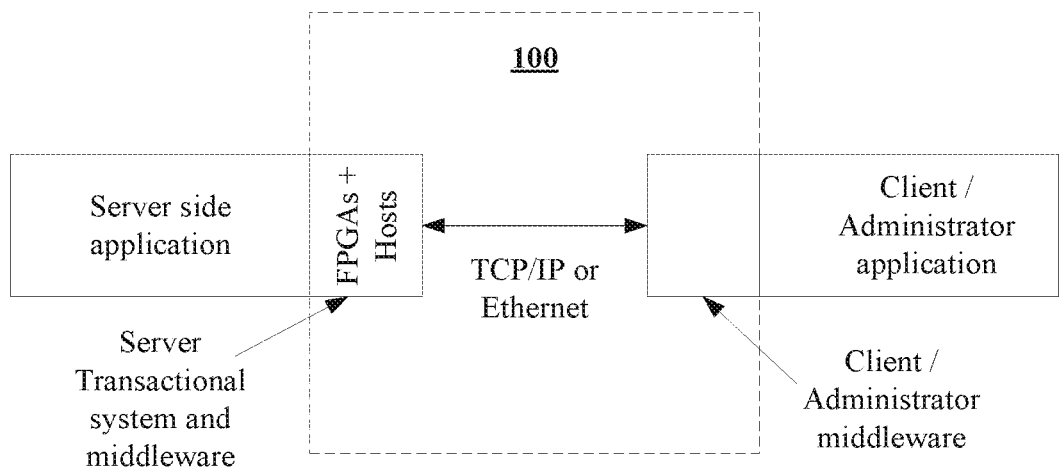
FIG. 2A illustrates an exemplary block diagram of a Field Programmable Gate Array (FPGA) based transaction system in accordance with an embodiment of the present disclosure.
Figure 2B:
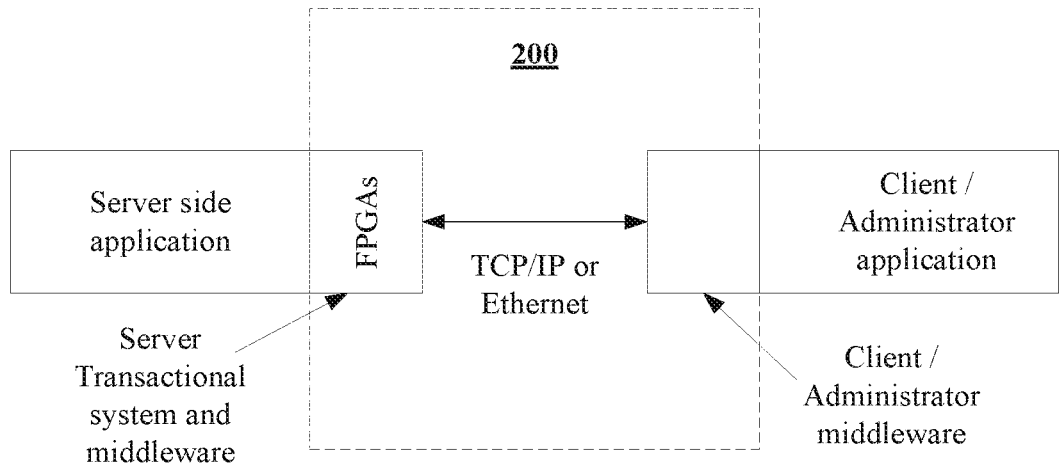
FIG. 2B illustrates an exemplary block diagram of an FPGA based transaction system in accordance with another embodiment of the present disclosure.
Figure 3A:
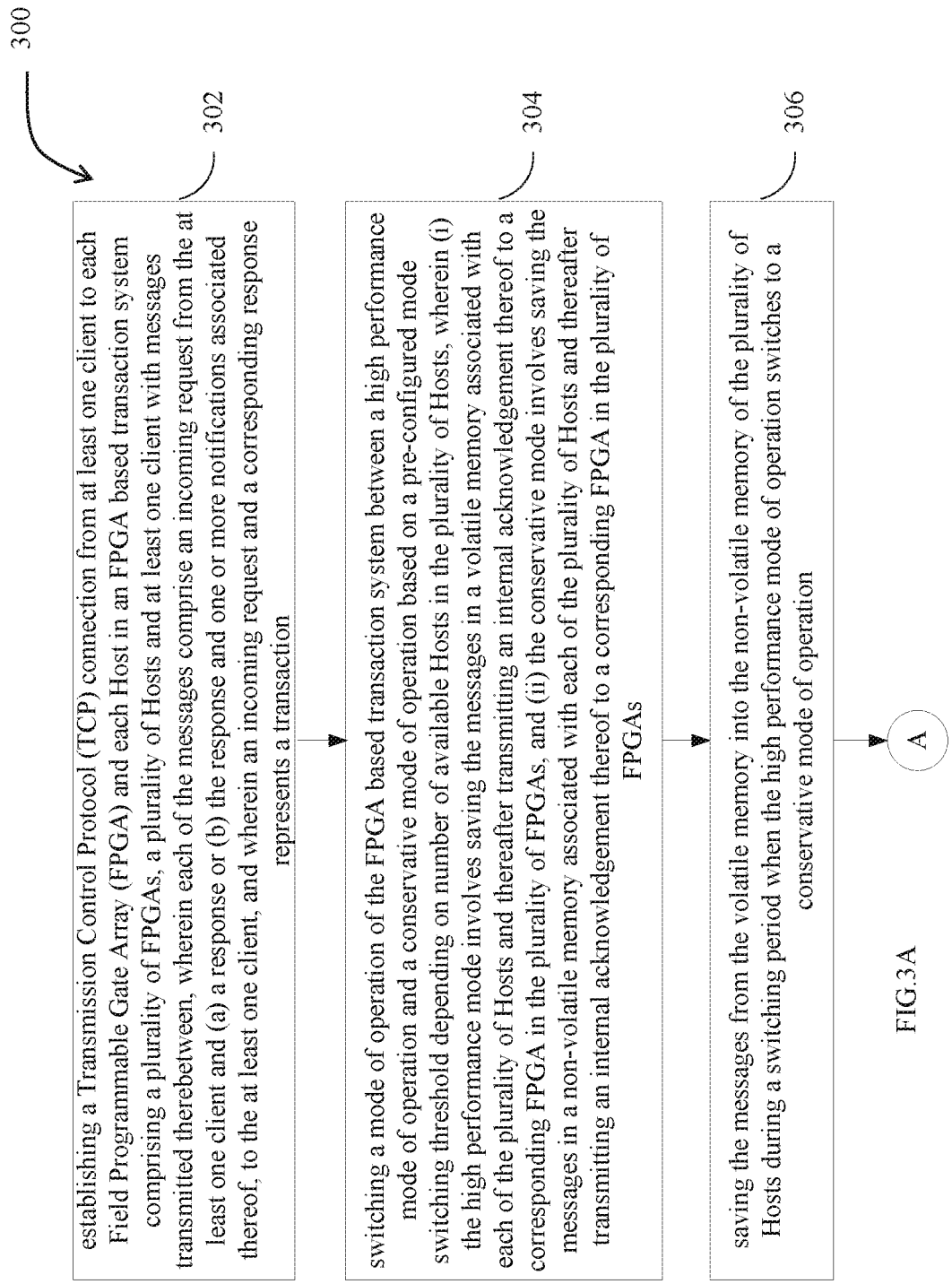
FIG. 3A through FIG. 3C is an exemplary flow diagram 300 illustrating a computer implemented method for achieving exactly-once transaction semantics in fault tolerant FPGA based transaction systems, in accordance with an embodiment of the present disclosure.
Figure 3B:
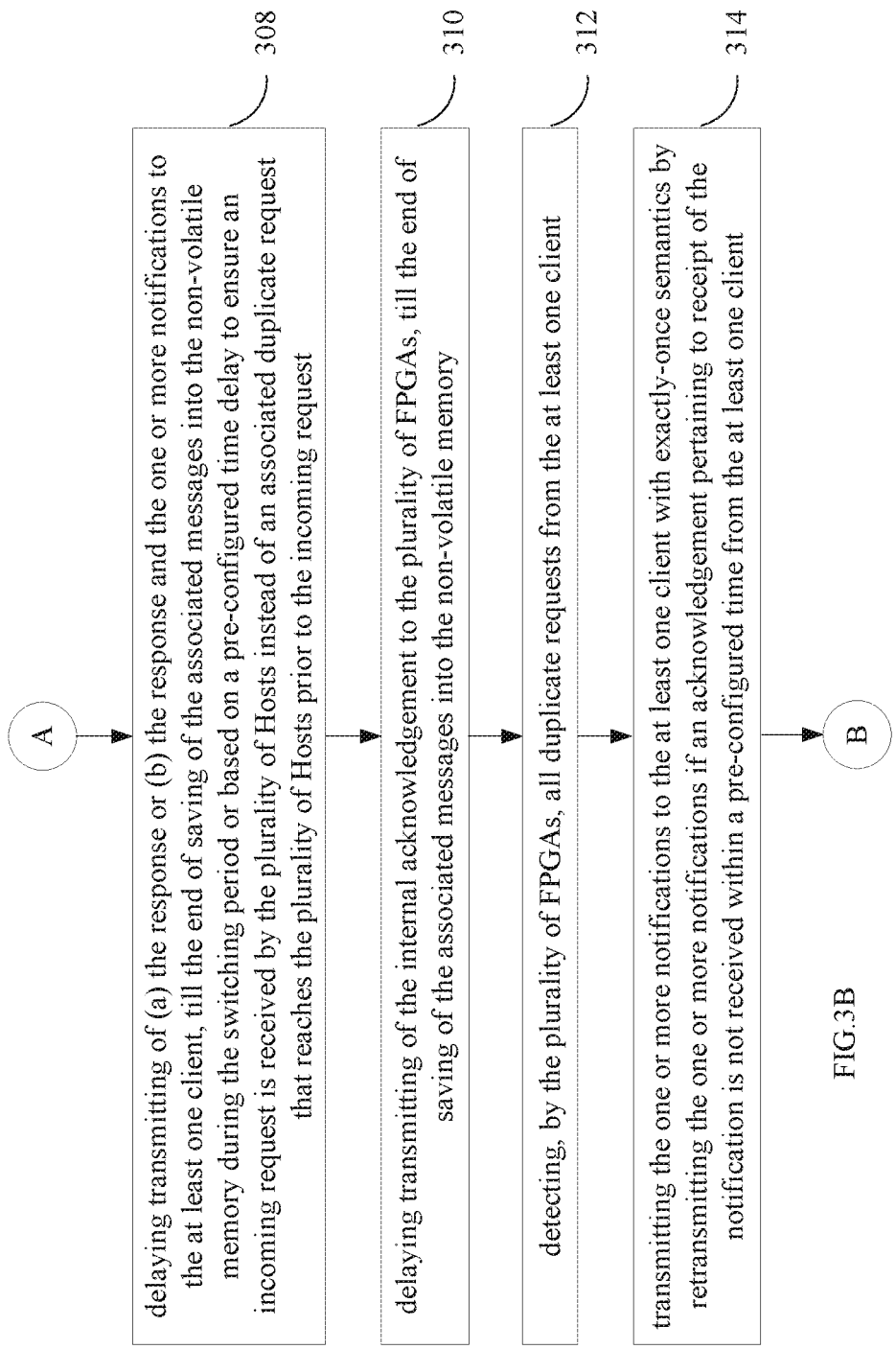
Figure 3C:
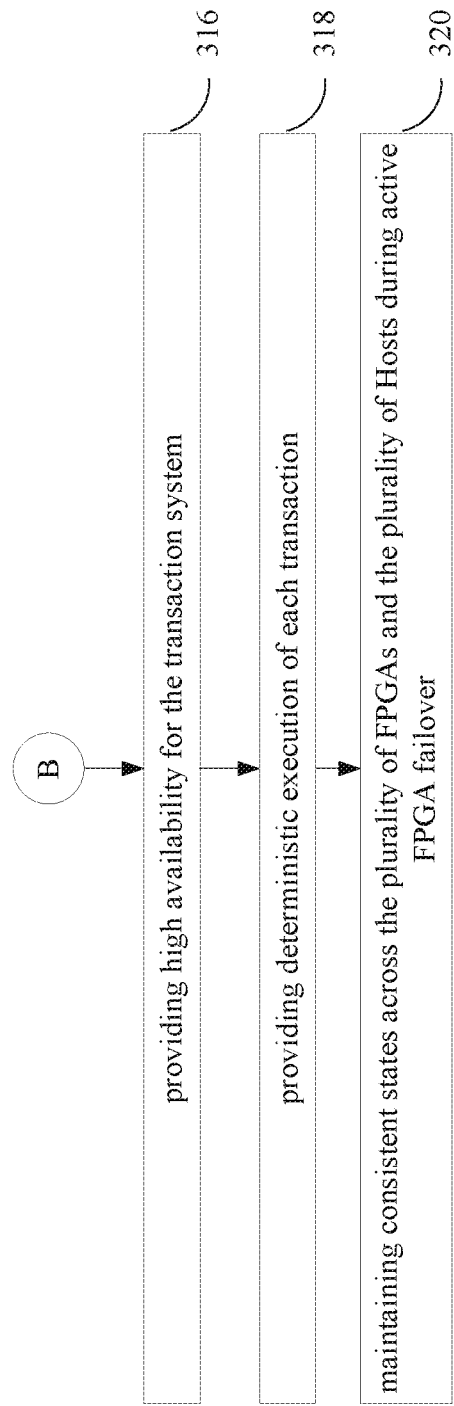

FIG. 2A and FIG. 2B illustrate exemplary block diagrams of Field Programmable Gate Array (FPGA) based transaction systems 100 and 200 respectively in accordance with two embodiments of the present disclosure, wherein the server system of the FPGA based transaction system 100 of FIG. 2A comprises a plurality of FPGAs co-operating with a plurality of Hosts whereas the server system of the FPGA based transaction system 200 of FIG. 2B comprises a plurality of FPGAs only. FIG. 3A through FIG. 3C is an exemplary flow diagram illustrating a method 300 for achieving exactly-once transaction semantics in fault tolerant FPGA based transaction systems, in accordance with an embodiment of the present disclosure. The steps of the method 300 will now be explained in detail with reference to the system 100 of FIG. 2A. The embodiment of FIG. 2B will be explained later in the description. Although process steps, method steps, techniques or the like may be described in a sequential order, such processes, methods and techniques may be configured to work in alternate orders. At least some of the steps may be performed via one or more appropriate interfaces (e.g., Application Program Interfaces (APIs).)

In accordance with an embodiment of the present disclosure, the FPGA based transaction system 100 of FIG. 2A represents an FPGA based transaction system that includes a plurality of FPGAs and a plurality of Hosts as part of middleware framework implemented at the server. In the context of the present disclosure, it may be noted that any reference to FPGAs is indicative of an FPGA card that may host one or more FPGAs and an internal memory referred to hereinafter as the volatile memory of the FPGAs. Each of the Hosts has a volatile memory and a non-volatile memory implemented as a key-value store. The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In the context of the present disclosure, the expressions 'memory' and 'storage' may be used interchangeably and any reference to 'database' implies a database hosted on the 'memory'. There may be a middleware framework at the client also to support exactly-once semantics and fault tolerance requirement. In the context of the present disclosure the expressions 'exactly-once semantics' and 'exactly-once transaction semantics' may be used interchangeably. In any embodiment, the middleware framework at the client may be implemented in software. In an embodiment, the connection between the client and the server may be established in the form of a standard TCP/IP networking stack. In an embodiment, Ethernet may be used at the lowest layer.

In accordance with the present disclosure, use of FPGAs as a platform enables extraction of maximum parallelism available in a transaction processing function without sacrificing latency in inter-process communication that exists in software platforms. A pre-established TCP connection between the server and the client eliminates handshake latency that may otherwise exist in the transaction system. Databases hosted in volatile memory in the form of DDR, SRAM, FPGA internal memory or a combination thereof also enable low latency.

In accordance with the present disclosure, in order to provide high availability, redundancy of components in ensured. Accordingly, from the plurality of FPGAs, one of the FPGAs is identified as an active FPGA and the remaining as passive FPGAs. The plurality of FPGAs is configured to co-operate with the plurality of Hosts and at least one client. The client establishes a Transmission Control Protocol (TCP) connection with each of the plurality of FPGAs.

Amongst the plurality of Hosts also, one of the Hosts is identified as an active Host while the remaining are passive Hosts. The client also establishes a TCP connection with each of the plurality of Hosts. The redundancy ensures, when one of the components fails, the transaction processing automatically failovers to a standby passive component in a pre-determined sequence of the plurality of components. The pre-determined sequence of the plurality of components is intended to ensure there is no clash between the passive components to take over as the active component. In accordance with the present disclosure, to achieve redundancy, an application state needs to confirm to deterministic execution. Along with other conditions discussed later in the description (such as ordered locking), it is necessary that the sequence of transactions entering each replicated component is the same for achieving consistency across components for true redundancy and high availability.

In accordance with the present disclosure, to support exactly-once transaction semantics, the methods and systems described hereinafter ensures that the client application gets messages destined to it exactly-once with no gaps in messages and no messages delivered twice regardless of any failure. Accordingly, the FPGA based transaction systems of the present disclosure provide exactly-once semantics with the following properties:

At most once execution of incoming requests
No invention of response
No duplication of response
At least once reception of response The exactly-once properties span across states where the components are available or unavailable, i.e. if the component has failed and then recovered, it should return to the exact transactional state prior to failure.

To achieve exactly-once semantics, messages are logged to non-volatile memory before sending or transmitting. This applies to both, client and server. In case a receiver has not received a message, the log can be queried to retrieve and resend the messages. Entries in the log are deleted only once it is determined that the client application has consumed the response of the transaction—which the client notifies by sending an acknowledgement. Transactions slowdown in such an exactly-once implementation, latencies and throughputs are clamped by the I/O speeds of the non-volatile storage on the server side. Speed of non-volatile storage technologies is 10× lower than the volatile storage technology. Also, transaction rates of all the clients combined has to be supported by the server and this may result in a severe processing bottleneck and the performance of the transaction system may be affected. Hence in accordance with the present disclosure, instead of writing to a non-volatile memory, the writes may be made to a volatile memory and further the writes may be replicated by writing the same message in parallel in two or more separate volatile memory controlled by their respective processing components. The volatile memories of all the components may then have same contents and may be updated in parallel. If for some reason one of the processing components fails, the data in the other components may be available and used to continue the processing and thereby prove that replication as stated serves as a write to a non-volatile memory. Thus the high availability provided by redundancy is made resilient to failures. Again, this resiliency to failures may be used to cover up for recovery in case of a failure in case of use of non-volatile memory. Moreover use of parallelism may buy performance while providing fault tolerance.

Failure of a transaction system also includes client failures. To ensure exactly-once semantics, even if the client application fails, the same state should be seen in terms of messages. There should be no loss or duplication of messages delivered to the client application. Also, the clients need to be able to query and retrieve prior transactions and notifications which means the transaction system needs to be able to store and retrieve them. In an embodiment of the present disclosure, the client middleware supports the recovery to let the transactions be exactly-once. As soon as the application passes the message to the client middleware, the message is logged to a storage after a sequence number is generated and before it transmits an acknowledgement to the FPGA over TCP (TCP acknowledgement—between client and server at packet level). On restart following a crash, the client middleware checks its request and response logs. All requests without a matching response are sent to the FPGA again. The FPGA then checks with the Host and sends responses which have been committed at the Host and processes other incoming requests and sends the response back to the client. In an embodiment, for high performance, the client may write using non-volatile memories like Intel's™ 3D cross point with memory access latencies of 10 microseconds. In accordance with an embodiment of the present disclosure, to support query of prior transactions, all messages need to be eventually written to a non-volatile memory.

In accordance with the present disclosure, a configurable delay may be introduced when persisting in the high performance mode to tune the interval at which the transaction messages and notification messages are persisted to the non-volatile storage. Ideally, this value should be set to as low as possible to help in reducing the switchover time from the high performance mode to the conservative mode to as low as possible. That way the system tends closer to delivering exactly-once semantics. The only reason this value may be increased is to be able to batch a large number of transactions and notifications to achieve high efficiency in persisting to non-volatile memory. This may be essential when the incoming rate of transactions is very high—in that scenario a low value for this setting may mean addition of write queuing delays to transaction latency.

Figure 4A:
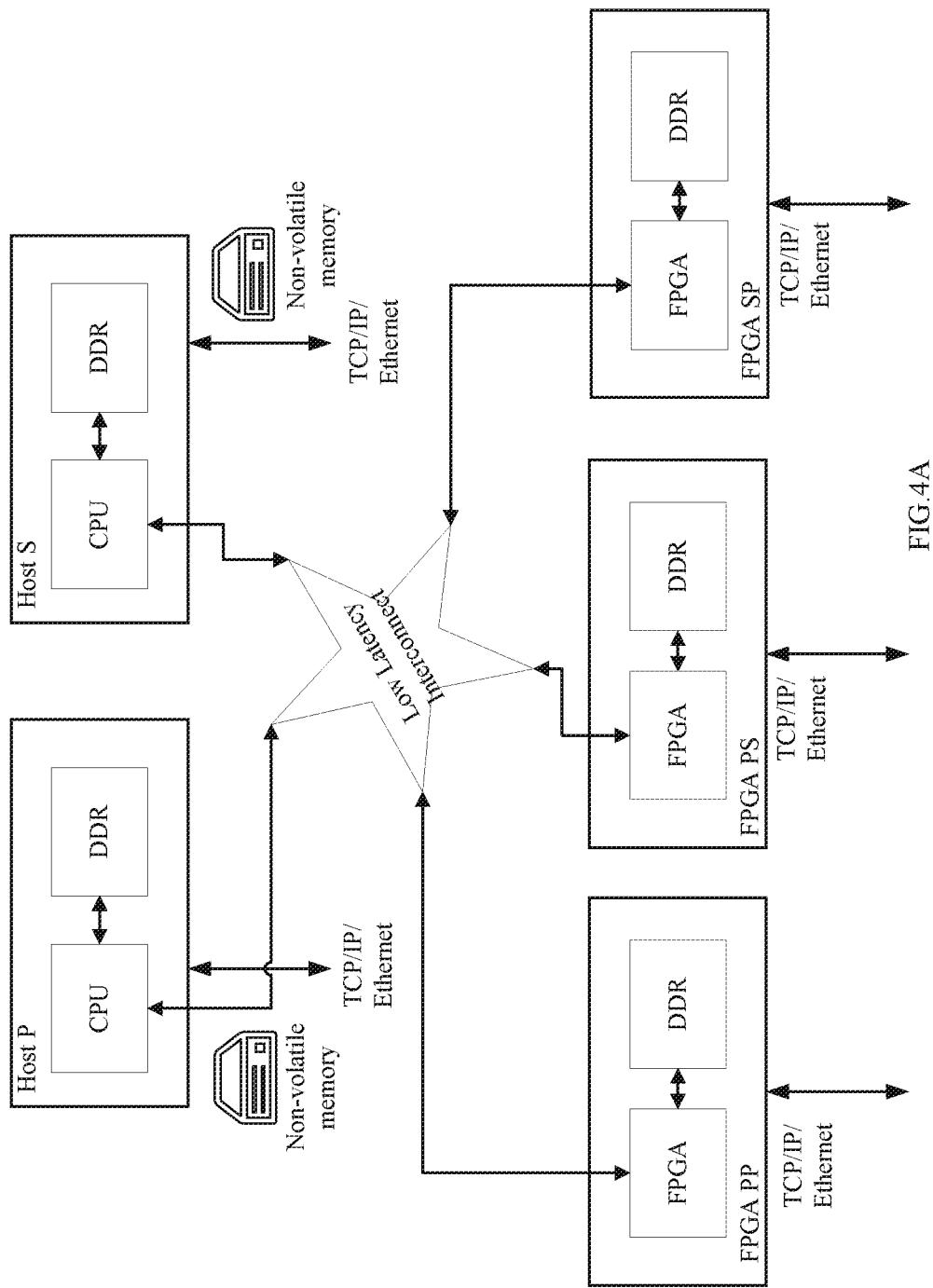
FIG. 4A is an exemplary architecture of the FPGA based transaction system of FIG. 2A, in accordance with an embodiment of the present disclosure.

FIG. 4A is an exemplary architecture of the FPGA based transaction system 100 of FIG. 2A, in accordance with an embodiment of the present disclosure. As seen in FIG. 4A, redundancy of components is provided for high availability. Although the exemplary architecture represents a certain number of components (redundancy factor M), it may be understood that the number is only representative and may be configured as desired. For ease of description, the description hereinafter may be limited to the no. of components illustrated in the accompanying drawings. Hosts are needed since FPGA based systems need the support of host CPU based systems for power, configuration and other administrative tasks. For some networks such as Peripheral Component Interconnect Express (PCIE), this may be a mandatory requirement. Alternately, if FPGAs can provide these tasks, the Hosts may be eliminated from the architecture to provide an architecture without a Host as illustrated schematically in FIG. 2B. In accordance with step 302 of the method 300 of the present disclosure, a TCP connection is established from at least one client to each FPGA and each Host (one client in the exemplary illustration of FIG. 4A) and messages are transmitted therebetween, wherein each of the messages comprise an incoming request or a resubmitted request from the client and (a) a response or (b) the response and one or more notifications to the client, and wherein an incoming request and a corresponding response represents a transaction as illustrated in FIG. 1. In the context of the present disclosure, the resubmitted request is caused by concurrent execution by the server application as explained later in the description.

In FIG. 4A, Host P and Host S refer to a primary Host or an active Host and a secondary Host or a passive Host respectively. FPGA PP refers to an active FPGA and is associated with Host P. FPGA PS refers to a first passive FPGA and is associated with Host P. FPGA SP is a second passive FPGA and is associated with Host S. In an embodiment, FPGA PS is located proximate to FPGA PP and accordingly its communication with FPGA PP has lower latency compared to FPGA SP. The FPGA based transaction system 100 interfaces with a client as shown through the TCP/IP/Ethernet network stack which terminates on a corresponding FPGA card. Each FPGA card and the Host may be configured with an IP address and a port. When the FPGA based transaction system 100 starts up, the client is configured with the IP address and ports of all the 3 FPGA cards and all the 2 Hosts. The client starts communicating with the FPGA PP. In case of a communication failure, the client starts communicating with the FPGA PS and on failure of FPGA PS, the client attempts communication with FPGA SP. The client communicates with the FPGAs and the Hosts over TCP connections and accordingly, there are at least 5 TCP connections from the client to the server. In accordance with an embodiment, the connections between the client and the FPGAs are used to send requests, receive responses and notifications in normal steady state scenarios. The connections between the client and the Hosts are used to resend prior response and notifications, if any, during transient client recovery scenarios. The client may also use the connections with the Hosts to query for prior transaction messages and notifications persisted in the non-volatile memory of the Host. Depending on the query traffic between the Hosts and the client, the FPGA based transaction system 100 may further be configured to send messages from the Hosts to the client during steady state scenarios.

In accordance with the present disclosure, the client maintains connections concurrently with the active and passive FPGAs and the active and passive Hosts. Though active communication may take place only with the active FPGA and active Host, the other connections are maintained as standby for quick failover in case of failure of any of the Hosts or FPGAs.

In addition to the 5 TCP connections mentioned above there may also be a User Datagram Protocol (UDP) multicast group which is used to send control messages from the server side to the clients with low latency. Since UDP is a lossy protocol the controls messages are also sent across the TCP connections as a backup.

Depending on availability of the 5 server side components in the exemplary architecture of FIG. 4A, the FPGA based transaction system 100 may have 2 states of function viz., available and unavailable. In the available state, there may further be a fully available state when all the 5 server side components are up and there is network connectivity between any pair of all 5 endpoints. In the context of the present disclosure, the expression 'endpoint' refers to an FPGA or a Host on the server side and may also be interchangeably referred as 'component'. In the available state, there may further also be a partially available state when one Host and one FPGA are up and running with full network connectivity between them. In the unavailable state, there may be more component failures than the partially available state or loss of connectivity between the endpoints in the partially available state.

In accordance with step 304 of the method 300 of the present disclosure, the FPGA based transaction system 100 may switch mode of operation between a high performance mode of operation and a conservative mode of operation based on a pre-configured mode switching threshold (K) depending on the number of available Hosts in the plurality of Hosts, wherein $1<K<=M$. In an embodiment, the high performance mode involves saving the messages in the volatile memory associated with each of the plurality of Hosts and thereafter transmitting an internal acknowledgement (between the endpoints) thereof to a corresponding FPGA in the plurality of FPGAs. In an embodiment, the conservative mode involves saving the messages in the non-volatile memory associated with each of the plurality of Hosts and thereafter transmitting an internal acknowledgement thereof to a corresponding FPGA in the plurality of FPGAs.

In accordance with step 306 of the method 300 of the present disclosure, the messages may be saved from the volatile memory into the non-volatile memory of the plurality of Hosts during a switching period when the high performance mode of operation switches to a conservative mode of operation. As mentioned earlier, the plurality of Hosts are in communication with the client. In accordance with step 308 of the method 300 of the present disclosure, transmitting of the (a) the response or (b) the response and the one or more notifications to the at least one client, may be delayed till the end of saving of the associated messages into the non-volatile memory during the switching period or based on a pre-configured time delay to ensure an incoming request is received by the plurality of Hosts instead of an associated duplicate request that reaches the plurality of Hosts prior to the incoming request. Detection of duplicate requests is explained later in the description and it may be noted that duplicate requests and incoming requests are sent to the Hosts from two different Units of the FPGAs and as such there is a possibility of the duplicate request reaching the Host prior to the incoming request. The delay introduced by step 308 accounts for this aspect. In accordance with step 310 of the method 300 of the present disclosure, the transmittal of the internal acknowledgement to the plurality of FPGAs may be delayed till the end of saving of the associated messages into the non-volatile memory.

Figure 4B:
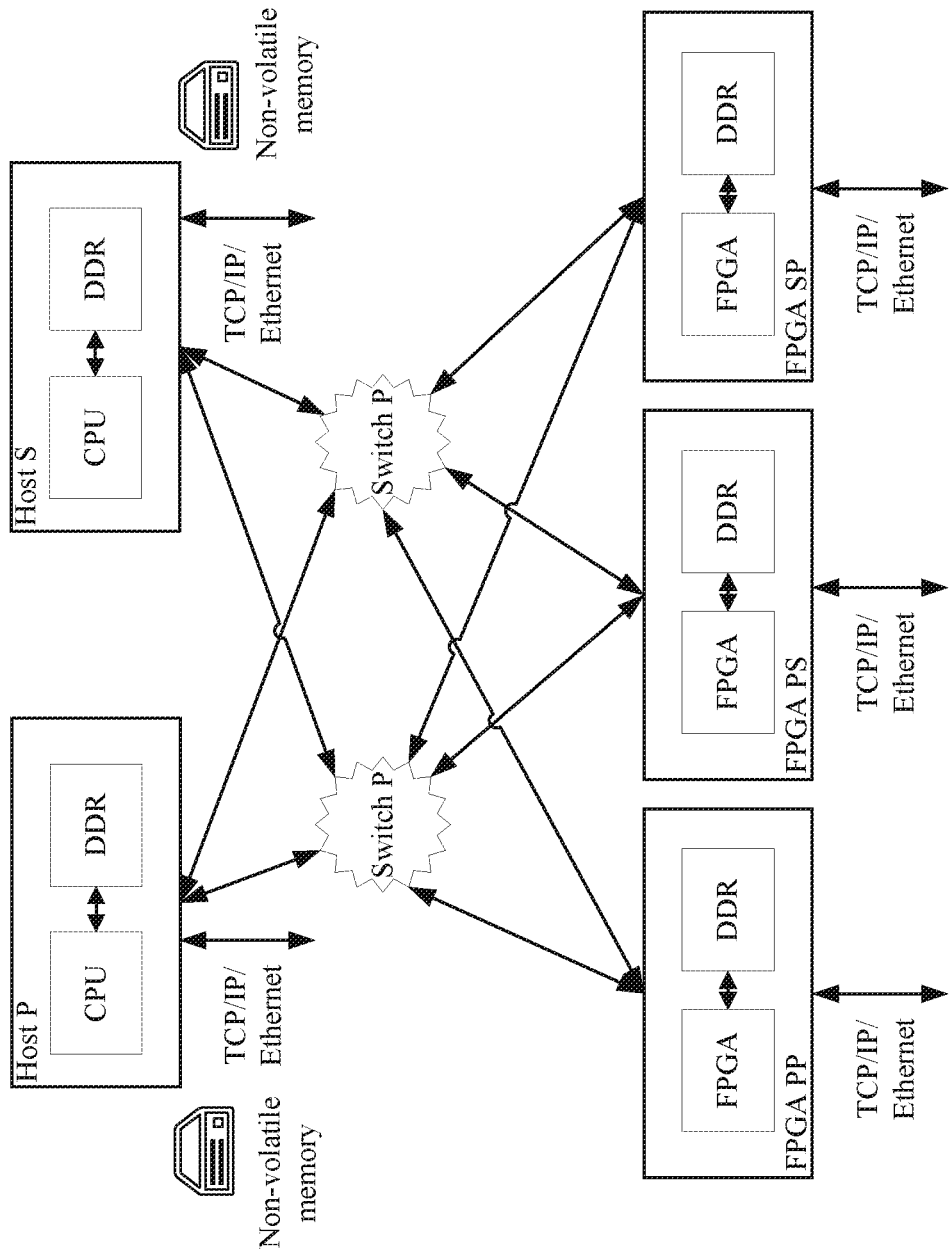
FIG. 4B is another exemplary architecture of the FPGA based transaction system of FIG. 2A, in accordance with an embodiment of the present disclosure.

FIG. 4B is another exemplary architecture of the FPGA based transaction system of FIG. 2A, in accordance with an embodiment of the present disclosure. The plurality of FPGAs and the plurality of Hosts may be connected over either (i) a Peripheral Component Interconnect Express (PCIE) network, (ii) a combination of PCIE and Infiniband network, or (iii) a combination of Remote Direct Memory Access (RDMA) over Converged Ethernet (RoCE) network and Infiniband network.

Logical switches (Switch P) in FIG. 4B may be replaced with a set of switches and links without loss of generality to achieve a physical manifestation. In an embodiment, some physical implementations include: Host P, FPGA PP and FPGA PS may be connected via PCIE. Likewise, Host S and FPGA SP may also be connected via PCIE. The FPGA cards maybe inserted into PCIE slots of the respective hosts or they could be inserted in PCIE expansion boxes which have PCIE slots. In another embodiment, FPGA PP and FPGA PS may be connected to Host S and FPGA SP via Infiniband or Ethernet or PCIE. In an embodiment, if the Hosts are based on IBM™ Power8 then OpenCaPI over PCIE may be a higher layer protocol used in place of DMA over PCIE, which is the default.

FIG. 5 is an exemplary microarchitecture of the FPGA constituting the FPGA based transaction system of FIG. 2A, in accordance with an embodiment of the present disclosure. Each of the plurality of FPGAs comprises various functional units as described hereinafter.

Figure 6B:
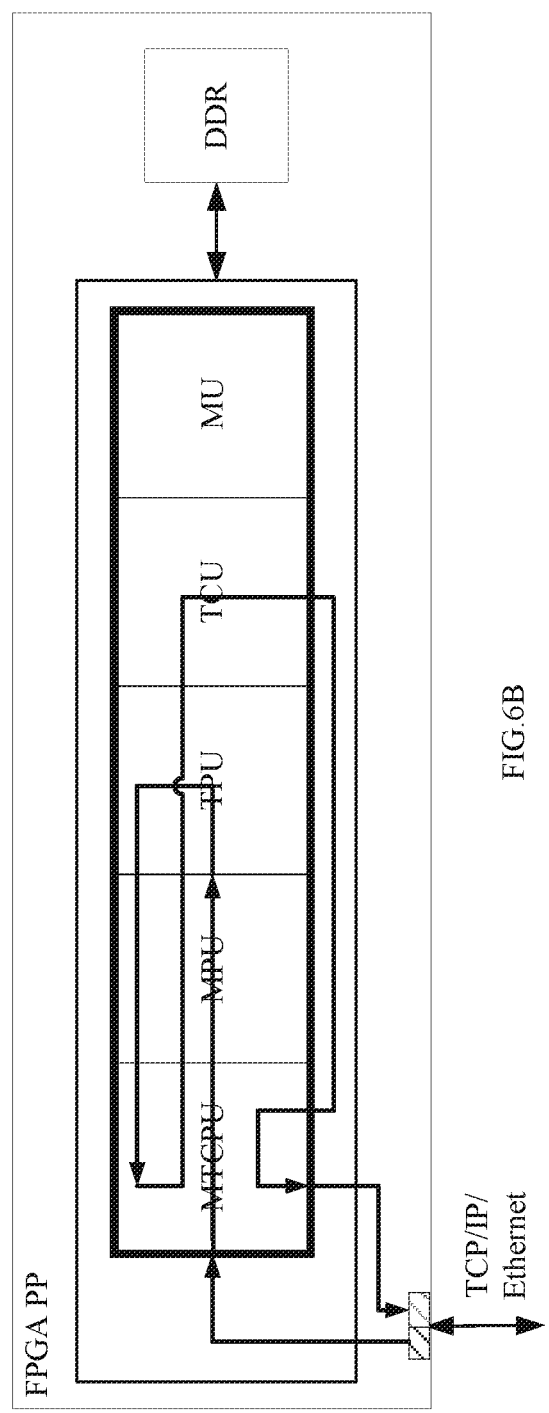
FIG. 6B is an exemplary sequence of processing a message for a transaction that has been resubmitted, rescheduled and committed after resubmission, within an active FPGA, in accordance with an embodiment of the present disclosure.

A Modified Transmission Control Protocol Unit (MTCPU) is configured to receive TCP packets corresponding to incoming requests, by the MTCPU of the active FPGA, from the client in communication with the plurality of FPGAs and the plurality of Hosts at the server side of the FPGA based transaction system 100. The TCP packets are appended with at least a time-stamp as a non-deterministic parameter. The MTCPU of the active FPGA publishes the TCP packets to the passive FPGAs and an internal acknowledgement of the incoming requests is transmitted to the client post internal acknowledgement of receipt of the TCP packets by the passive FPGAs. The MTCPU of the active FPGA is also configured to schedule the incoming requests along with the resubmitted requests caused by concurrent execution by an application hosted by the FPGA, wherein the resubmitted requests are prioritized over the incoming requests. Resubmitting of requests is also illustrated in FIG. 6B referred later in the description. The MTCPU is further configured to optimize performance by preparing TCP packets corresponding to (a) the response or (b) the response and the one or more notifications such that the prepared TCP packets may be transmitted to the client as soon as an internal acknowledgement is received from the plurality of Hosts. In accordance with the method 300 of the present disclosure, not waiting for the internal acknowledgement and then preparing the TCP packets helps in achieving low latency.

A Message Parsing Unit (MPU) is configured to detect duplicate requests received based on associated request identifiers. The TCP packets, received in a sequence from the MTCPU, are parsed and converted into a message format associated with a network (wire) between the client and the plurality of FPGAs and the plurality of Hosts. The incoming requests in the message format are then passed in the received sequence s to a Transaction Processing Unit (TPU).

The TPU is configured to host the application which processes the incoming requests and the resubmitted requests from the MPU and (a) the response or (b) the response and the one or more notifications for sending to a Transaction Commit Unit (TCU). The TPU also receives the resubmitted requests caused by the concurrent execution from the application and sends the resubmitted requests to the MTCPU for scheduling via the MPU.

The Transaction Commit Unit (TCU) is configured to receive (a) the response or (b) the response and the one or more notifications sent from the TPU. Messages comprising the incoming requests or the resubmitted requests and associated (a) response or (b) the response and the one or more notifications, are generated by the TCU and transmitted to the plurality of Hosts for either committing or transmitting to the client. In accordance with the present disclosure, transmitting of messages to the client may be performed by the MCTPU of the FPGA; however, if there is reduced query traffic between the Hosts and the client, the FPGA based transaction system 100 may be configured to avoid a hop to the FPGA and directly transmit the messages from the Hosts to the client once the messages are committed.

A Monitoring Unit (MU) is configured to monitor and initiate an FPGA failover process in the event an active FPGA failure is detected.

FIG. 6A is an exemplary sequence of processing a message for a transaction that did not need to be resubmitted, within an active FPGA, in accordance with an embodiment of the present disclosure. The arrow indicates the sequence of processing a message undergoes from entry to exit of the TCP/IP/Ethernet interface for a transaction that did not need to be resubmitted. In the passive FPGAs the MPU receives the packets (TCP stream) from the MTCPU of the active FPGA. Rest of the processing in the passive FPGA is the same as in the active FPGA.

FIG. 6B is an exemplary sequence of processing a message for a transaction that has been resubmitted, rescheduled and committed after resubmission, within an active FPGA, in accordance with an embodiment of the present disclosure. The arrow illustrates the sequence when an incoming request has been resubmitted by the application residing in the TPU and rescheduled by MTCPU and is committed after resubmission. Resubmitting of the requests by server side application occurs when it realizes new lock dependencies it did not know at the start of processing. In the passive FPGAs, the resubmitted requests along with the incoming requests are received from the MTCPU of the active FPGA.

The description now pertains to fault tolerance achieved in accordance with the methods and systems of the present disclosure steps to ensure continued operation even if some components fail. In accordance with an embodiment of the present disclosure, fault tolerant operation involves fault tolerance in message reception achieved by making multiple copies of a message to multiple endpoints over a low latency high bandwidth interconnecting link provided therebetween. Given the parallelism in FPGA, the present disclosure enables making multiple copies of messages without substantial time overhead. As incoming requests get delivered on the Ethernet (or TCP/IUP) link, the requests get copied to multiple locations in parallel. In the exemplary architecture of FIG. 4A, the MTCPU in FPGA PP copies the incoming requests to FPGA PS and FPGA SP (over PCIE or RDMA) in addition to its own DDR or internal memory. A modified lockless publish-subscribe mechanism using RDMA or PCIE DMA may be used to copy the TCP packets corresponding to the incoming requests from Ethernet into FPGA PP memory, FPGA PS and FPGA SP memories for each client connection. After an internal acknowledgement from a transport layer on the copy to the memories, a TCP acknowledgement of the incoming requests is transmitted to the client. The multiple copies ensure that if FPGA PP fails, then the message is available in either FPGA PS or FPGA SP. Therefore, messages once acknowledged to the sender (client) are never lost. In case FPGA PP has only one PCIE connection, then for copying to FPGA PS and FPGA SP in parallel over PCIE techniques like DMA multicast available in the PCIE switches may be utilized in an embodiment of the system 100 of the present disclosure. In accordance with another embodiment, multiple Infiniband (physical) connections from FPGA PP to FPGA PS and FPGA SP may be used to enable the multiple copies. The TCP stack (MTCPU) of the FPGA interfaces with the Message Parsing Unit (MPU) on all the FPGAs with the main outputs including signaling of available data, client connection identifier that identifies the connection on which the data has been sent (client IP address and port) and incoming message contents. The TCP stack (MTCPU) strictly outputs byte streams of the application payload in the order in which they were recorded on the Ethernet link. The middleware in the server side implemented on FPGA is responsible for parsing the TCP packets and converting them into messages for transaction processing as described with reference to FIG. 5 above. As soon as complete messages are detected, they are passed (queued up) to the TPU. It is this order of TCP packets that appear in the active FPGA from the plurality of clients, which decides the state of the database at any instant of time.

Figure 7A:
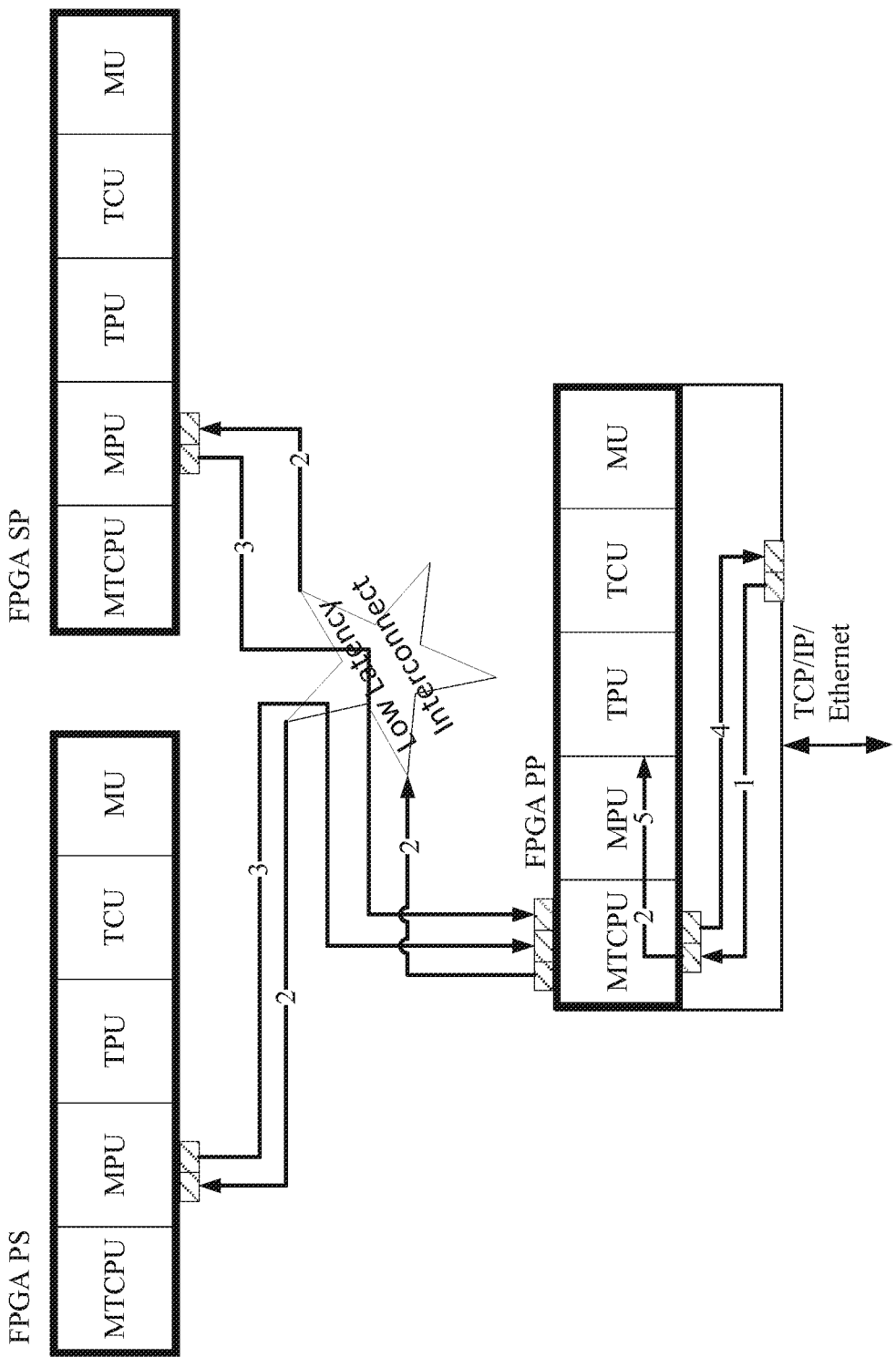
FIG. 7A is an exemplary sequence of operations for fault tolerance in message reception, in accordance with an embodiment of the present disclosure, when processing a message for a transaction that did not need to be resubmitted.

FIG. 7A is an exemplary sequence of operations for fault tolerance in message reception, in accordance with an embodiment of the present disclosure, when processing a message for a transaction that did not need to be resubmitted. The sequence numbers indicated in the figure are illustrative of steps as mentioned below.
1. MTCPU receives the TCP packets corresponding to the incoming request.
2. Message copied over PCIE DMA/Infiniband RDMA to MPU in FPGA PS and FPGA SP and to MPU in FPGA PP over a lockless Pub Sub mechanism. (along-with results of non-deterministic functions explained in FIG. 7B).
3. Acknowledgment from the subscribers (part of the lockless pub sub queuing mechanism)
4. TCP Acknowledgement sent back to client.
5. TCP packets parsed and sent to the TPU (can be in parallel with steps 3 and 4).

Figure 7B:
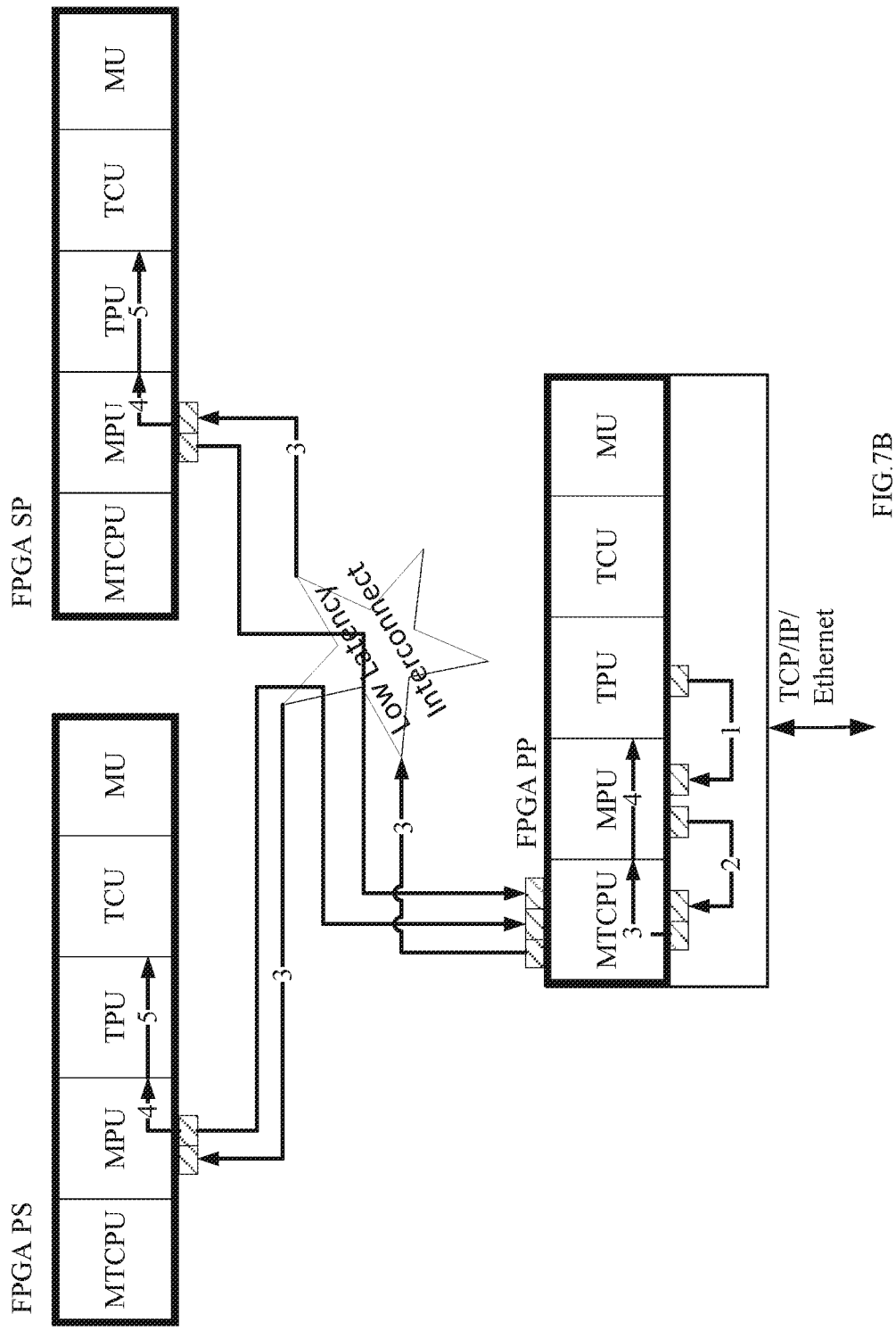
FIG. 7B is an exemplary sequence of operations for fault tolerance in message reception, in accordance with an embodiment of the present disclosure, when processing a message for a transaction that has been resubmitted.

FIG. 7B is an exemplary sequence of operations for fault tolerance in message reception, in accordance with an embodiment of the present disclosure, when processing a message for a transaction that has been resubmitted. The sequence numbers indicated in the figure are illustrative of steps as mentioned below.
1. Application (TPU) resubmits the request and queues up the message to the MPU.
2. The MPU stores the resubmitted request and associates it with the client identifier and the request identifier being a sequence number and in the active FPGA passes it to the MTCPU.
3. The MTCPU, after a configured delay, sends the resubmitted request to the MPU in all the FPGAs. The TCP packets are appended with at least a time-stamp as a non-deterministic parameter.
4. The MPU retrieves the resubmitted request based on the client identifier and the request identifier and passes it to the TPU, along with non-deterministic parameters forwarded by the active FPGA. The application is expected to use these parameters if the semantics require them.
5. After the resubmitted request is processed successfully the response and notifications, if any, are passed to the TCU.

In accordance with an embodiment of the present disclosure, fault tolerant operation involves detection of duplicate requests from the client. As explained earlier, the client middleware tags each incoming request with a client identifier and a request identifier. Likewise, a corresponding response is tagged with the request identifier and a corresponding notification is tagged with a unique notification identifier. In accordance with the present disclosure, after the client middleware generates the request identifier, it persists the message before sending to the server (FPGA). On receiving the response from the server, the client middleware persists the response. Once the application at the client end acknowledges the message, both the request and the response are deleted. Every incoming request is stored in the key-value store with the client identifier and the request identifier as the key. The request identifier being a unique sequence number, the maximum sequence number received from the client is also noted. If the client recovers after a failure, it may lose some responses that were received but failed before they were persisted. As a result, the client may resend all requests for which it does not get a response. In accordance with step 312 of the method 300 of the present disclosure, the plurality of FPGAs detects duplicate requests, if any, from the client. When the server side receives the request, it first checks the request identifier and appends the same to a list of request identifiers maintained in each of the plurality of FPGAs if the request identifier is not available in the list and if the associated sequence number is greater than the maximum sequence number received from the client. If the request identifier is available in the list, then its processing is in progress and the request is discarded or ignored. An associated response and optionally one or more notifications is then obtained from the application and transmitted to the plurality of Hosts followed by which the associated request identifier is deleted from the list. The request along with the associated response and optionally one or more notifications received by the plurality of Hosts is then stored in an appropriate key-value store depending on the mode of operation. If the associated request identifier is not available in the list of request identifiers and if it is less than the maximum sequence number received from the client, the request is detected as a duplicated request and instead of processing it, the plurality of FPGAs passes it to the plurality of Hosts for retrieving the response and optionally one or more notifications from the key-value store in the plurality of Hosts that is then transmitted to the client or particularly the client middleware. Upon receipt of an acknowledgement pertaining to consuming the response and optionally one or more notifications by the client, the message is deleted from the volatile memory of the plurality of Hosts after saving in the non-volatile memory.

In accordance with step 314 of the method of the method 300 of the present disclosure, if an acknowledgement pertaining to receipt of the one or more notifications is not received within a pre-configured time from the client, the one or more notifications are retransmitted to the client as part of the exactly-once semantics.

If availability has to be achieved with redundancy then the application state (or its database state) needs to confirm to deterministic execution. To ensure state of each database is consistent the sequence of transactions entering each replicated component is required to be the same. Only then would it be possible to fail-over to a redundant component when an active component fails. Otherwise, replication is of no use. In accordance with an embodiment of the present disclosure, fault tolerant operation involves replicated message processing across all FPGAs with same state of the database by implementing ordered locking. If the TCP packets corresponding to the incoming requests are sent in the same sequence for processing across all the FPGAs, and if the FPGAs process the messages in sequence one after the other, all the FPGAs are in the same state as regards reception of incoming requests from the client. In practice, ordered locking is typically implemented (by the server application) by requiring transactions to request all associated locks immediately upon entering the system, although there exists transaction classes for which this may not be possible. Such a scenario may occur if the application needs to process messages concurrently. If application semantics allows every transaction get access to its lock dependencies in a First in First out (FIFO) order, then it is possible to achieve replicated state across each FPGA. In other words, a transaction issued later should not get access to the locked data earlier than a previously issued transaction. This ordering of lock grants needs to be ensured by the application. In accordance with the present disclosure, once the application learns dependencies as part of partial execution of a transaction, there is a need to resubmit the transaction. Accordingly an API is provided for the method 300 to resubmit the transaction every time a new lock dependency is learnt by the application. Every time the transaction has to be resubmitted, it rolls back and is scheduled (by the MTCPU) in a next batch of transactions to be executed with priority over the incoming requests. The transaction finally commits or aborts finally after the client application learns all of its lock dependencies.

In accordance with step 316 of the method 300 of the present disclosure, fault tolerant operation involves achieving high availability. Firstly redundancy is achieved by identifying one of the plurality of FPGAs as an active FPGA and one of the plurality of Hosts as an active Host, remaining FPGAs and remaining Hosts from the plurality of FPGAs and the plurality of Hosts being identified as passive FPGAs and passive Hosts respectively. It is essential that any failures be alerted to the administrators as fast as possible. The monitoring strategy consist of 2 parts—Active FPGA monitoring and a Host exclusively for monitoring. The active FPGA monitoring further has a 2 fold monitoring strategy. If there have been any transaction within a preset heartbeat threshold, there is no need for a heartbeat to confirm whether a component is live. In accordance with the present disclosure, the heartbeats are therefore adaptive. The MU comprised in the active FPGA initiates heartbeat requests to each of the passive FPGAs and the plurality of Hosts only in the absence of internal messages between the plurality of Hosts and the plurality of FPGAs within the preset heartbeat threshold that otherwise serve as a heartbeat indicating live FPGAs and live Hosts within the plurality of FPGAs and the plurality of Hosts respectively. The active Host (monitoring server) then updates the list of live FPGAs and live Hosts and publishes it in each of the components. In an embodiment, a monitoring server is a software component which runs in the active Host. In case there has been no transaction within the preset heartbeat threshold, the active FPGA sends the heartbeat requests to all endpoints, wait a certain preset heartbeat threshold for all the endpoints to revert and reports the status of the heartbeat responses to the monitoring server. The monitoring server is configured to run with Host P at the start. It actively checks connectivity of itself with Host S and the passive FPGAs.

In accordance with an embodiment of the present disclosure, an FPGA failover process is initiated to a next passive FPGA in the event that the client triggers the FPGA failover via the passive FPGAs or if a heartbeat request is not received by the monitoring server within the pre-set heartbeat threshold from the active FPGA indicating failure thereof. The next passive FPGA from a pre-determined sequence of the plurality of FPGAs and that is published in the list of live FPGAs and live Hosts is identified as the next active FPGA.

In accordance with an embodiment of the present disclosure, a configurable time delay maybe introduced when determining the next passive FPGA will be switched to an active FPGA. As the FPGA failover is carried out by all the passive FPGAs, it is possible that the passive FPGAs may also crash during the FPGA failover. Hence, the active Host may be configured to wait for a certain time to confirm end of failover from the FPGAs. Within this time if the next passive FPGA to be selected by default based on the pre-determined sequence as active does not send the confirmation, then the active Host designates the next passive FPGA in pre-determined sequence to take over as the active FPGA.

In accordance with an embodiment of the present disclosure, a Host failover process is initiated by a passive Host from a pre-determined sequence of the plurality of Hosts in the event that any of the passive Hosts do not receive a heartbeat request within the pre-set heartbeat threshold from the active Host indicating failure thereof. The passive Host from a the pre-determined sequence of the plurality of Hosts and that is published in the list of live FPGAs and live Hosts that initiates the host failover process is further identified as the next active Host.

In accordance with an embodiment of the present disclosure, the MU of the active FPGA is configured to immediately terminate wait for an internal acknowledgement or the messages pertaining to failure of additional Hosts and FPGAs based on the list of live hosts and live FPGAs sent by the monitoring server, determined using heartbeats during the FPGA failover process and the Host failover process.

In accordance with step 318 of the method 300 of the present disclosure, deterministic execution of each transaction is achieved to ensure requests are sent to all the replicated components in the same sequence. Firstly, the TCP packets corresponding to the incoming requests are appended, by the MTCPU, with at least a time-stamp as a non-deterministic parameter, wherein the prepared TCP packets constitute at least a portion of a message. Alternatively, one or more messages may be comprised in a prepared TCP packet. The MTCPU of the active FPGA then publishes the TCP packets to the passive FPGAs and thereafter transmits a TCP acknowledgement of the incoming requests to the client once an internal acknowledgement of receipt of the TCP packets by the passive FPGAs is received. In the event that resubmitted requests caused by recurrent execution by an application are received, only the request identifiers along with the non-deterministic parameter for the resubmitted requests are published by the active FPGA to the passive FPGAs. The resubmitted requests are stored as a key-value store in the volatile memory of the FPGAs and are scheduled for execution along with incoming requests but with a higher priority. In accordance with the present disclosure, a configurable delay in execution may be provided to account for transactions that may still be holding a lock desired by the resubmitted request.

In accordance with an embodiment of the present disclosure, fault tolerant operation involves achieving commit of a transaction in both modes of operation of the system 100. In the high performance mode, the messages are transmitted to Host P and Host S. This is implemented using a publish-subscribe FIFO mechanism. The subscribers here are Host P and Host S and the publisher is the active FPGA (FPGA PP). The subscribers acknowledge the messages as soon as it receives and save them in the non-volatile memory. When all the internal acknowledgements for the messages are received, the publisher FPGA PP sends the response and optionally the one or more notifications to the client. The Hosts receive the messages from all the FPGAs and save the messages received first from any of the FPGAs and discard the same messages received from the other FPGAs, but the internal acknowledgement is sent to all the FPGAs. The messages are later (asynchronously) persisted to non-volatile storage. This also achieves high throughput with low latency. In the conservative mode of operation, the only live Host may be either Host P or Host S. Once the response and optionally the one or more notifications are received from the plurality of FPGAs, it is first written to the non-volatile storage before it is acknowledged back. This way it is ensured that if the last remaining Host fails the transactions and messages are never lost. In this case, also the Hosts first persist the messages received first from any of the FPGAs and discard the same messages received from the other FPGAs, but the internal acknowledgement is sent to all the FPGAs. Similar commit strategy is used for notifications as well.

Figure 8:
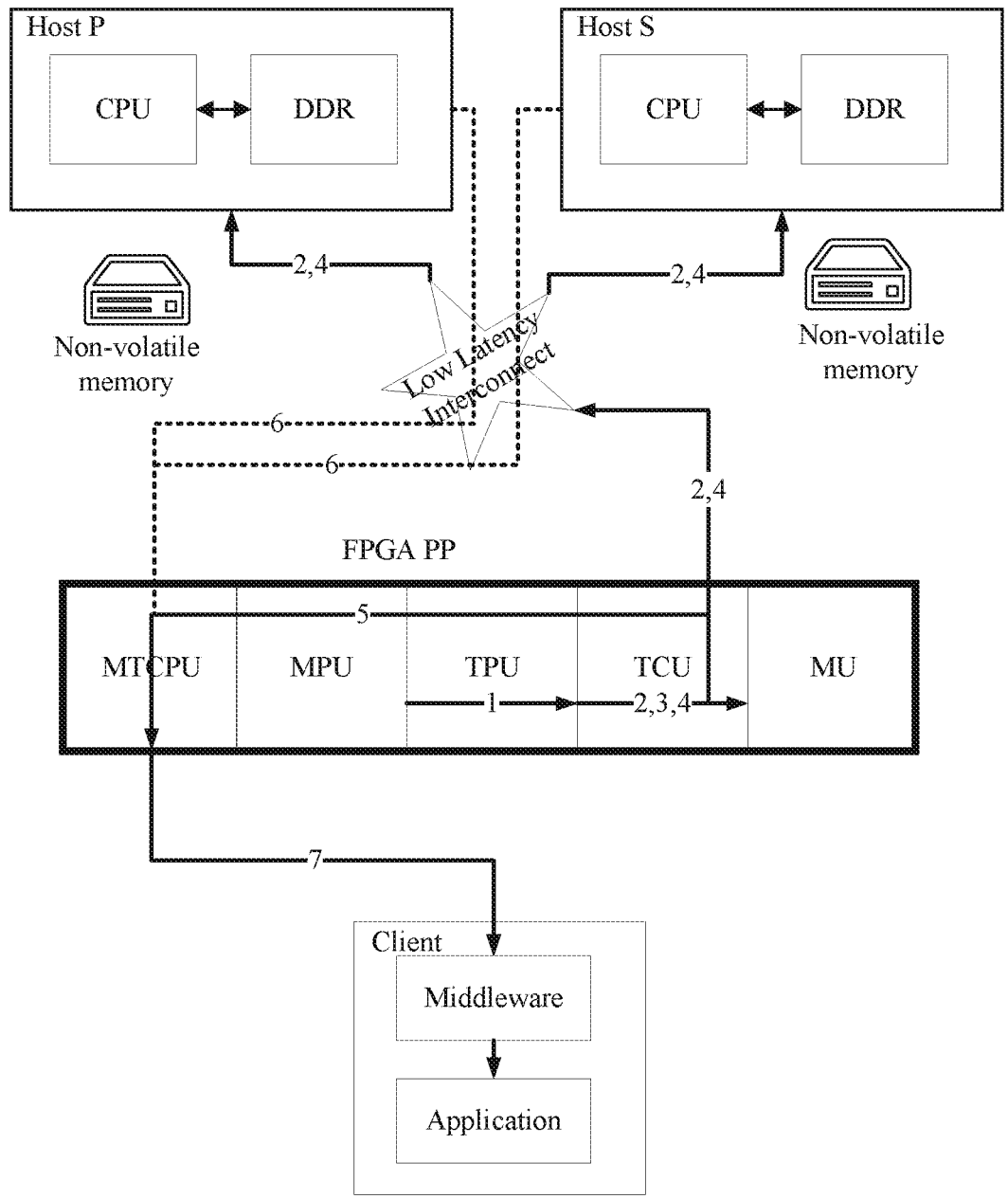
FIG. 8 is an exemplary sequence of operation for fault tolerance in commit of a transaction, in accordance with an embodiment of the present disclosure, when two Hosts are live.

FIG. 8 is an exemplary sequence of operation for fault tolerance in commit of a transaction, in accordance with an embodiment of the present disclosure, when two Hosts are live. The messages are forwarded to Host P and Host S after the requests are processed in the TPU of the active FPGA. The messages are passed to the MTCPU for preparing the TCP packets and transmitting as soon as acknowledgement from the Host is received thus optimizing performance. This applies to response messages and notifications. In the exemplary scenario illustrated, there is one notification generated in addition to a response. The sequence numbers indicated in the figure are illustrative of steps as mentioned below.

1. The TPU executes the transaction.
2. The TPU signals the TCU which generates the response and publishes it to the Host P and host S through a lockless queue.
3. The TCU process other asynchronous operations (notifications) that result as part of this transaction.
4. The TPU signals the TCU which generates the notification message and publishes it to Host P and host S through a lockless queue for notification.
5. The TCU transmits the message to the MTCPU.
6. The Hosts P and S acknowledge the message as soon as it is received (in parallel with 5). It saves the message it receives in the volatile memory.
7. On receiving the acknowledgement the MTCPU forwards the TCP packets to the client middleware.

Figure 9:
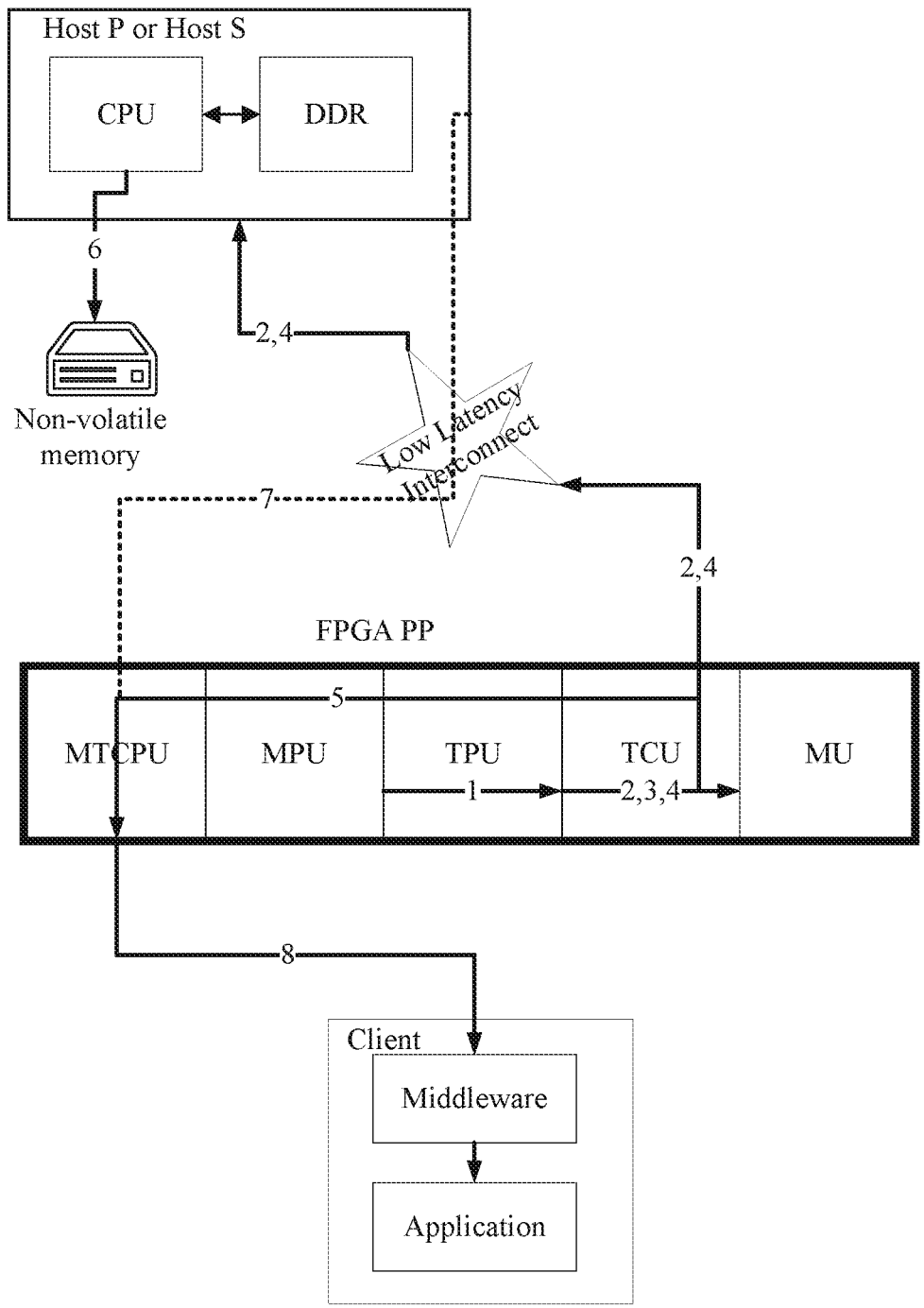
FIG. 9 is an exemplary sequence of operation for fault tolerance in commit of a transaction, in accordance with an embodiment of the present disclosure, when one Host is live.

FIG. 9 is an exemplary sequence of operation for fault tolerance in commit of a transaction, in accordance with an embodiment of the present disclosure, when one Host is live. The messages are forwarded to Host P or Host S, whichever is live, after the requests are processed in the TPU of the active FPGA. Once the message is received, the Host writes the message to non-volatile memory before acknowledging receipt of the message to the FPGAs. Meanwhile, the messages are passed to the MTCPU for preparing the TCP packets and transmitting as soon as acknowledgement from the Host is received thus optimizing performance. This applies to response messages and notifications. In the exemplary scenario illustrated, there is one notification generated in addition to a response. The sequence numbers indicated in the figure are illustrative of steps as mentioned below.

1. The TPU executes the transaction.
2. TPU signals the TCU which generates the response and publishes it to the Host P or host S through a lockless queue.
3. The TCU process other asynchronous operations (notifications) that result as part of this transaction.
4. The TPU signals the TCU which generates the notification message and publishes it to Host P and host S through a lockless queue for notification.
5. The TCU transmits the message to the MTCPU.
6. The Host P or Host S writes the message to non-volatile storage.
7. The Host P or Host S acknowledges the message.
8. On receiving the acknowledgement the MTCPU forwards the TCP packets to the client middleware.

Step 5 is executed in parallel with steps 6 and 7.

In accordance with an embodiment of the present disclosure, fault tolerant operation involves achieving fault tolerance in client notifications. The plurality of FPGAs send the response and optionally the one or more notifications to the client through the TCP connection. The client middleware receives the response and optionally the one or more notifications from all the FPGAs but only the first received response and optionally the one or more notifications are passed to the client application and the others are discarded as duplicates. This enables low latency response delivery as well as fault tolerance. In an embodiment, the TCP connection used for sending the response and optionally the one or more notifications may be the same as used by the client for sending requests to the FPGAs over the TCP/IP/Ethernet interface.

Figure 10:
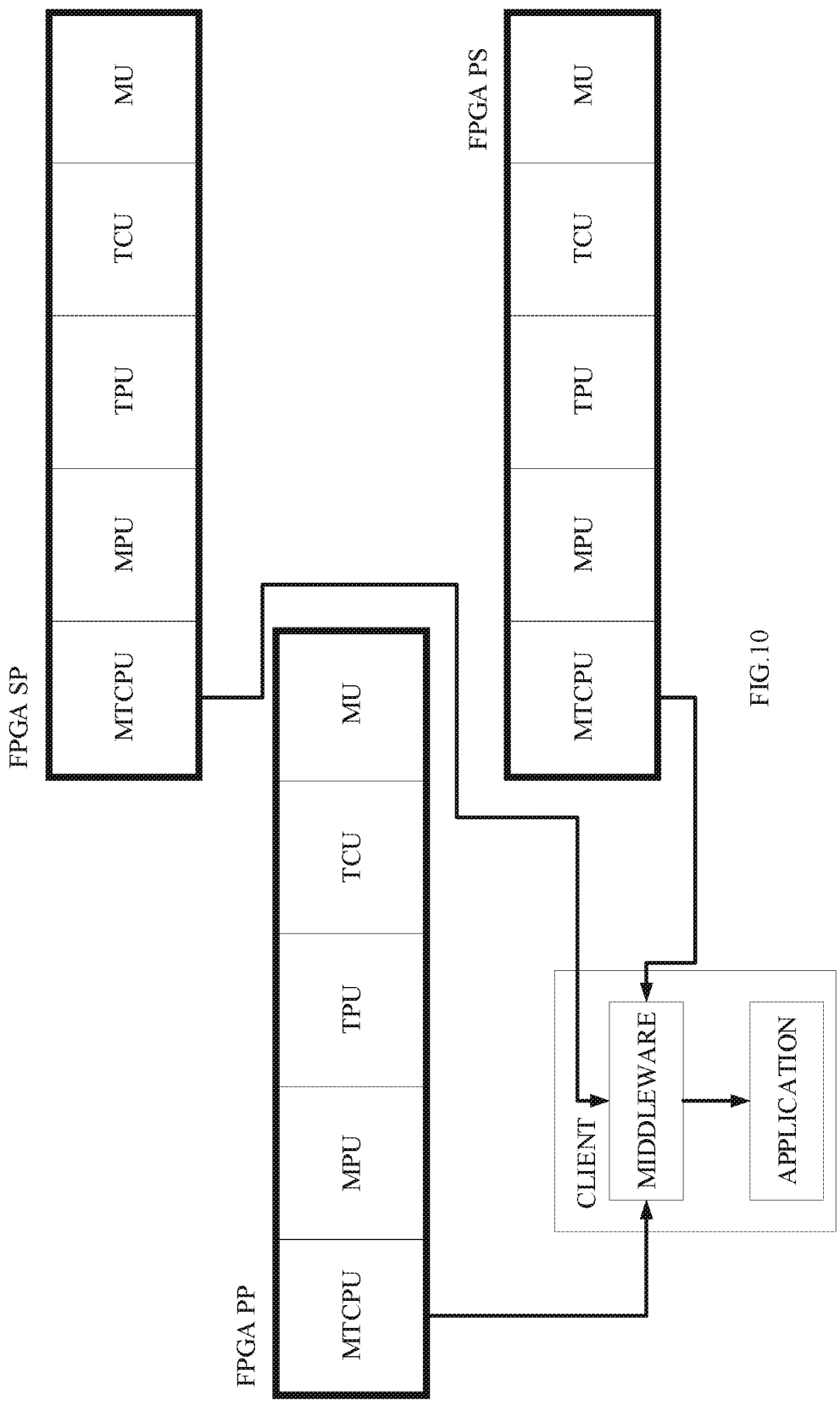
FIG. 10 is an exemplary sequence of operation for fault tolerance in client notification, in accordance with an embodiment of the present disclosure.

FIG. 10 is an exemplary sequence of operation for fault tolerance in client notification, in accordance with an embodiment of the present disclosure. As discussed, both the FPGAs send messages to the client over TCP/IP. The client middleware takes the first message that arrives and passes it to the application. The rest of the messages from other FPGAs are discarded.

In accordance with step 320 of the method 300 of the present disclosure, for maintaining consistent states across the plurality of FPGAs and the plurality of Hosts during active FPGA failover, all the TCP packets received from the MTCPU of the active FPGA by the MPU within each of the plurality of FPGAs are parsed. Incomplete messages are discarded by the plurality of FPGAs. The number of TCP packets received by the passive FPGAs is compared with the number of TCP packets in the active FPGA by the MPU of the active FPGA and missing TCP packets are copied from the active FPGA to the passive FPGAs and then processing of resubmitted messages in the plurality of FPGAs as explained earlier initiates.

Figure 11:
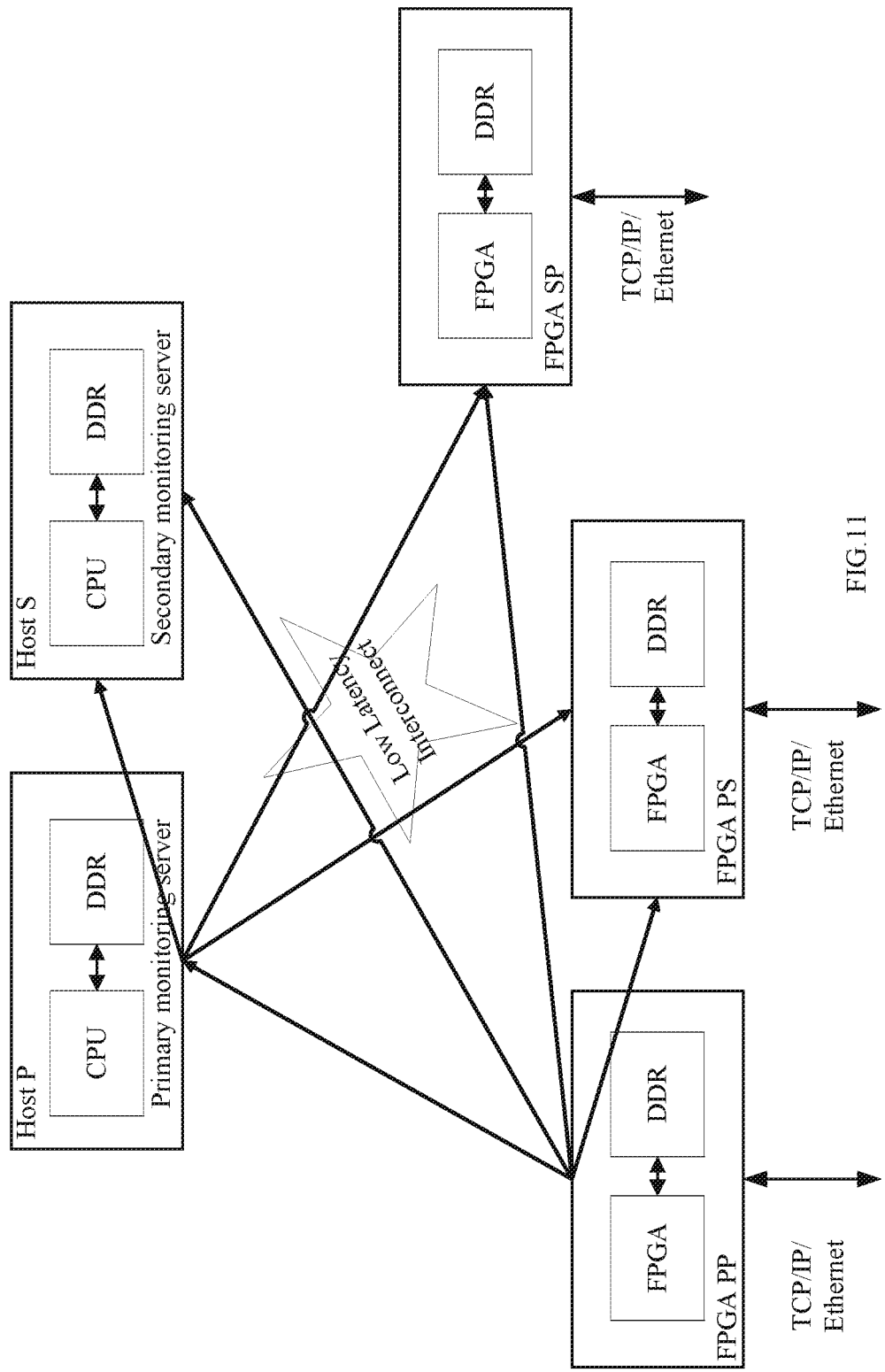
FIG. 11 is an illustration of an exemplary availability monitoring in accordance with an embodiment of the present disclosure.

FIG. 11 is an illustration of an exemplary availability monitoring in accordance with an embodiment of the present disclosure. The head of the arrows indicate the initiator of the heartbeat requests. All the heartbeat initiators send their heartbeat results to the monitoring server which is Host P. If Host P fails then Host S takes over as the monitoring server. The active FPGA (starting with FPGA PS in the fully available state) is shown to be initiating most of the heart beat messages. The passive endpoints in the heartbeat have an equal role to play—if they are not initiating a heartbeat, they expect to receive heartbeat messages and if they do not do receive the heartbeat messages, they alert the monitoring server. The active Host (starting with Host P in the fully available state) is initially configured as the monitoring server. In case it fails, Host S takes over as the monitoring server. It is also configured to initiate heartbeat requests to all endpoints except the active FPGA. In case the monitoring server does not get a heartbeat request within the preset heartbeat threshold from the active FPGA it initiates the FPGA failover process to a next passive FPGA at the end of which it is made active. Similarly if the passive Host does not get a heartbeat request within the preset heartbeat threshold from the active Host, it initiates the Host failover process to make itself the active Host.

It may be noted that setting a low value for the configurable variable, preset heartbeat threshold, helps in quick detection of failures, but at the same time may cause a lot of heartbeat messages which may interfere with transaction and notification traffic. The functions of the preset heartbeat threshold may be summarized as below.

1. Used by the active FPGA to decide if and when to send heartbeat requests to other endpoints.
2. Used to space successive heartbeat requests sent by the active FPGA and the active Host.
3. Used by the active Host and the passive Host to detect availability of the active FPGA and the active Host respectively in case the heartbeat has not been received within this threshold interval.
4. Used by the passive FPGAs to double check the availability of the active FPGA before proceeding with the failover process.

Figure 12:
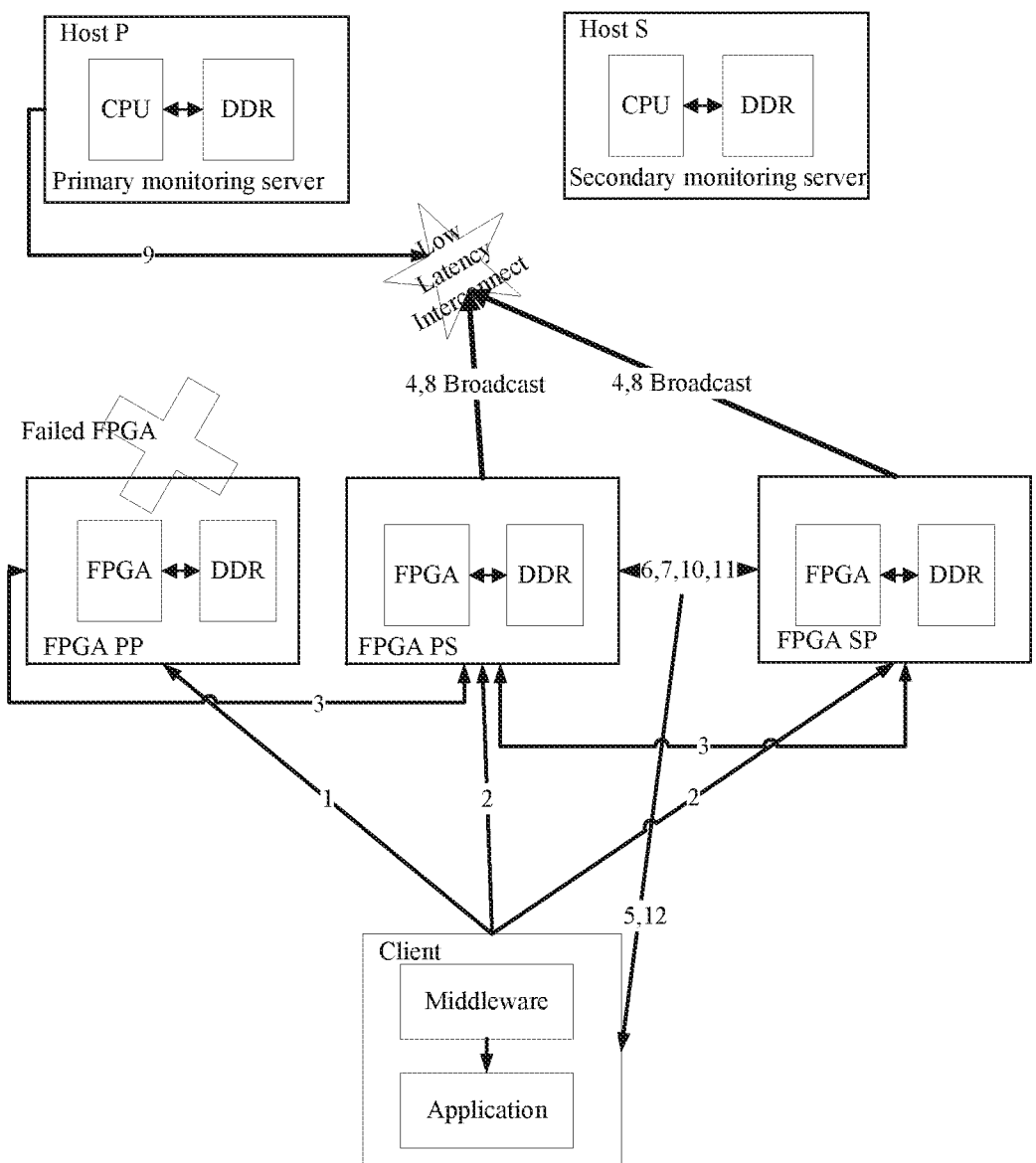
FIG. 12 is an illustration of exemplary recovery actions taken when an active FPGA fails, in accordance with an embodiment of the present disclosure.

FIG. 12 is an illustration of exemplary recovery actions taken when an active FPGA fails, in accordance with an embodiment of the present disclosure. The sequence numbers indicated in the figure are illustrative of steps as mentioned below.
1. The client detects failure in communication with primary FPGA PP.
2. The client sends a failover request message to FPGA PS and SP.
3. The FPGA PS and FPGA SP initiate a heartbeat sequence with FPGA PP through the client side network (TCP/IP/Ethernet). (If the heart beat is successful then FPGA PS informs the client accordingly—the client tries to connect again with FPGA PP).
4. If the heartbeat is unsuccessful, FPGA PS and SP signal the start of the FPGA failover process. This message is sent to all the end-points as a broadcast over the server side low latency network.
5. Signal a failover message to all the clients over TCP and additionally over the UDP multicast. (The next step need not wait for this step to complete)
6. FPGA PS and SP process the incoming FIFO queue to its MPU to be processed completely.
7. FPGA PS checks with FPGA SP the number of messages its MPU has processed. (TCP packet—at most both FPGAs differ by one message). If FPGA PS has an additional TCP packet it passes that TCP packet to FPGA SP or vice versa.
8. FPGA PS and FPGA SP signal the end of the failover phase. This message is sent to all the end-points as a broadcast over the low latency network. This message contains the last message sequence number committed by each client.
9. The Host P sends a broadcast message to all the endpoints that FPGA PS has taken over as new active FPGA.
10. The FPGA PS sets up publish-subscribe (or point to point there is only one subscriber) queue with FPGA SP.
11. If there were still any resubmitted requests pending, then the new Active FPGA pushes them for processing to its MTCPU from where it resumes normal processing.
12. Once all the resubmitted results have completed processing, FPGA PS takes over as primary and announces/broadcasts this to all the clients by both FPGA PS and SP.
13. The client sends the request to the FPGA PS, which is now the active server (The TCP connection is already there—so the handshake latency is eliminated). This is not shown in FIG. 12.

In the scenario presented above it was the client that initiated the failover after detecting that it could not communicate to FPGA PP.

In the event that the Host P detects the failure first and starts the failover In this case, the sequence of steps starts with step 5 and so on to completion. In this case, the Host P signals the start of the active failover phase. In case FPGA PP is unable to communicate to even one of the hosts or even one of the other FPGA's it will inform the client to attempt failover to the other FPGA's. There could be another failure when the recovery is in progress. Assuming there is no client failure, there are four possibilities of failure—FPGA PS, any other endpoint other than FPGA PS, internal connectivity between the end points or connectivity from the client to the FPGA PS.

If FPGA PS fails, it is known that the client has sent the failover request to FPGA SP as well. While the FPGA failover is in progress, the monitoring host realizes through the heartbeat mechanism that FPGA PS has failed. The monitoring server then selects FPGA SP as the Active FPGA if the failure has been detected before the active FPGA selection. In this case, the FPGA SP takes over and operations proceed as normal. In the case where failure happens when Active FPGA has already been selected, the client middleware times out and resends the request for FPGA failover to all passive FPGAs in which case FPGA SP also receives the request and reinitiates the failover sequence. It is also possible that the monitoring server detects and sends control message to FPGA SP to initiate failover.

When other endpoints (FPGAs or hosts) fail, as updated by the monitoring server, the wait for internal acknowledgements is immediately terminated for the corresponding endpoint. If one of the Hosts P or S fails also, the remaining hosts do not acknowledge transactions unless the switching activity is completed, so response to incoming messages and notifications are delayed. If Host P had failed during FPGA failover, Host S has been getting all the messages in any case. Therefore, Host S after completion of the switching activity decides on which FPGA is the active FPGA and sends a message accordingly.

If internal connectivity from FPGA PS fails, it informs the client to failover to other FPGAs.

If connectivity from the client to FPGA PS fails, there is redundancy (in physical connections) to protect against this scenario. If the redundant physical connections fail, manual rectification is needed, after which the client starts communicating. In accordance with the present disclosure, even if this happens, all messages are processed exactly-once.

In the event of a client failure a recovery process is involved which includes retrieval of old response and notification messages. The broadcasts mentioned above may be implemented optimally within the server system of the Hosts and the FPGAs using PCIE DMA multicasts and Infiniband/RoCE.

The broadcasts to the clients are internally implemented by using point to point mode TCP connections with priority given to those clients who have requested for a failover. In an embodiment, an additional UDP multicast may also be made so that most clients possibly receive the message faster.

One of the key functions of the Hosts is to keep a record of all the transactions and notifications. It is essential that these are never lost. The FPGAs therefore send a copy of the messages to the hosts and wait for their acknowledgement before sending a response or a notification message to the clients and administrators. Thereby the system achieves high performance as there is no write to persistent storage involved during transaction and notification processing. In the state where both the Hosts are live, the redundancy covers up as persistent storage. The write to persistent storage happens asynchronously after the client acknowledges the message or notification. However in the event when, one of the Hosts fail, there is a risk that while the client may receive the responses and notifications, another failure at the hosts may cause these messages to be lost. The other host (Active or Passive) will change functionality to synchronously commit every transaction and notification before acknowledging to the FPGAs. The sequence of steps in more detail at the last remaining Host when it realizes that it is the last Host is provided below.
1. Stop all the immediate acknowledgements to the FPGAs of transactions and notifications.
2. Persist all the transactions and notifications in volatile memory to the non-volatile memory.
3. Once done send all acknowledgements to the FPGAs only after persisting the messages to the non-volatile memory.

It is important that the second Host does not fail in the interval between the failure of the first Host and till the time the last memory resident transaction and notification is persisted into the non-volatile memory to avert loss of the messages in the volatile memory. This time interval however may be engineered to be as low as possible. In an embodiment of the present disclosure, the servers may be provided with battery backup; then the remaining time provided by the battery may be used to persist the buffered messages to non-volatile memory.

Figure 13:
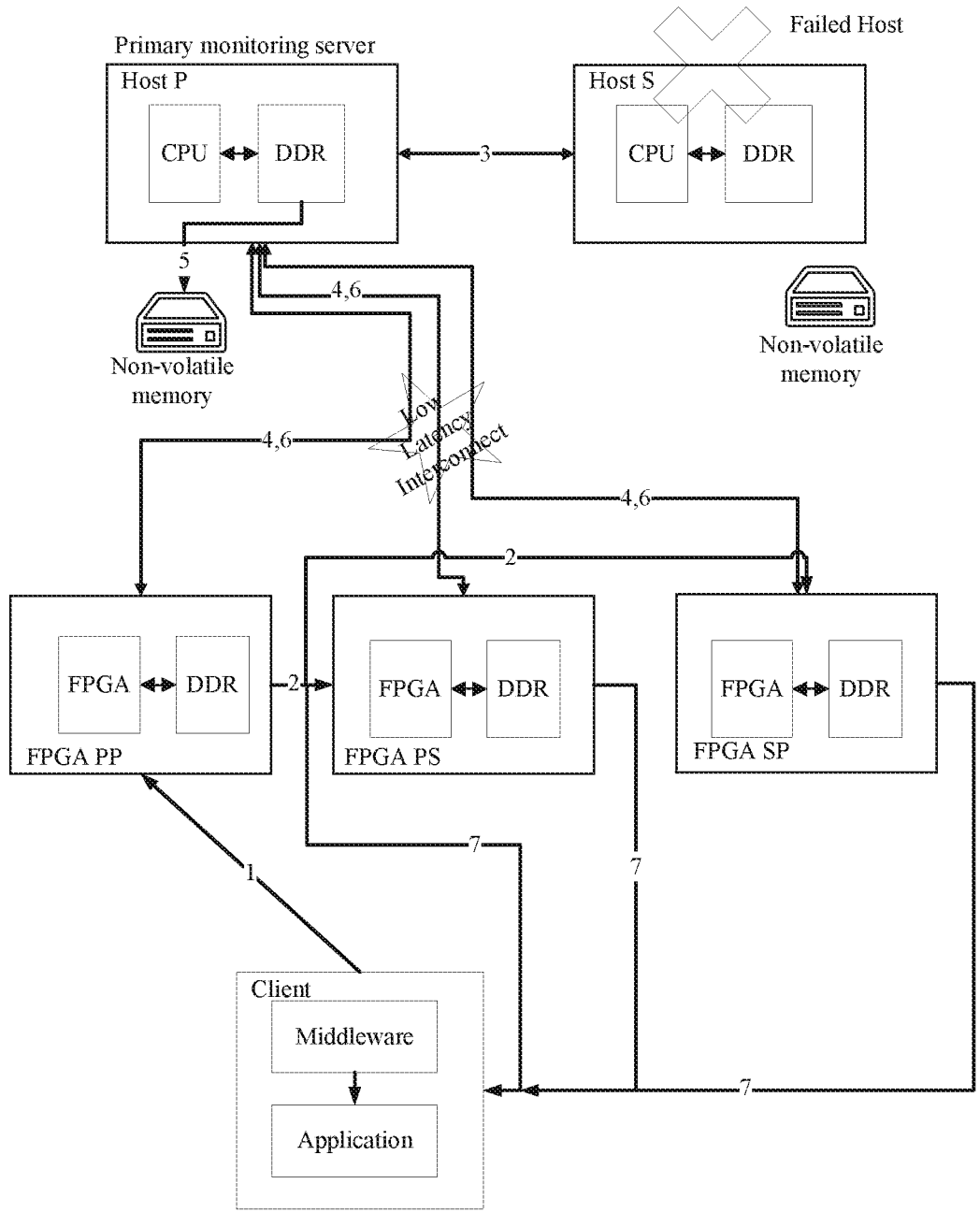
FIG. 13 is an illustration of an exemplary sequence of events when a Host fails, in accordance with an embodiment of the present disclosure.

FIG. 13 is an illustration of an exemplary sequence of events when a Host fails, in accordance with an embodiment of the present disclosure. The sequence numbers indicated in the figure are illustrative of steps as mentioned below.
1. Client sends request message to FPGA PP.
2. FPGA PP copies the request to FPGA PS and SP.
3. Host P detects that Host S has failed and it initiates conversion into synchronous mode copying data from the volatile memory into the non-volatile storage.
4. FPGAs PP, PS and SP process the message send a request to commit the transaction to Host P. (For this scenario it is assumed that all the FPGAs have received the information regarding Host S failure).
5. Host P completes the persistence of all the messages from the volatile memory into the non-volatile memory.
6. Host P persists the transaction commit message sent by the FPGAs and acknowledges back to the FPGAs.
7. The FPGAs send the response message back to the client. If there is one more endpoint failure from the partially available state, the system becomes unavailable. If the last FPGA fails, the clients do not get to send or receive messages. If the last host fails then the FPGA is not be able to send any response messages and the system is unavailable.

Figure 14:
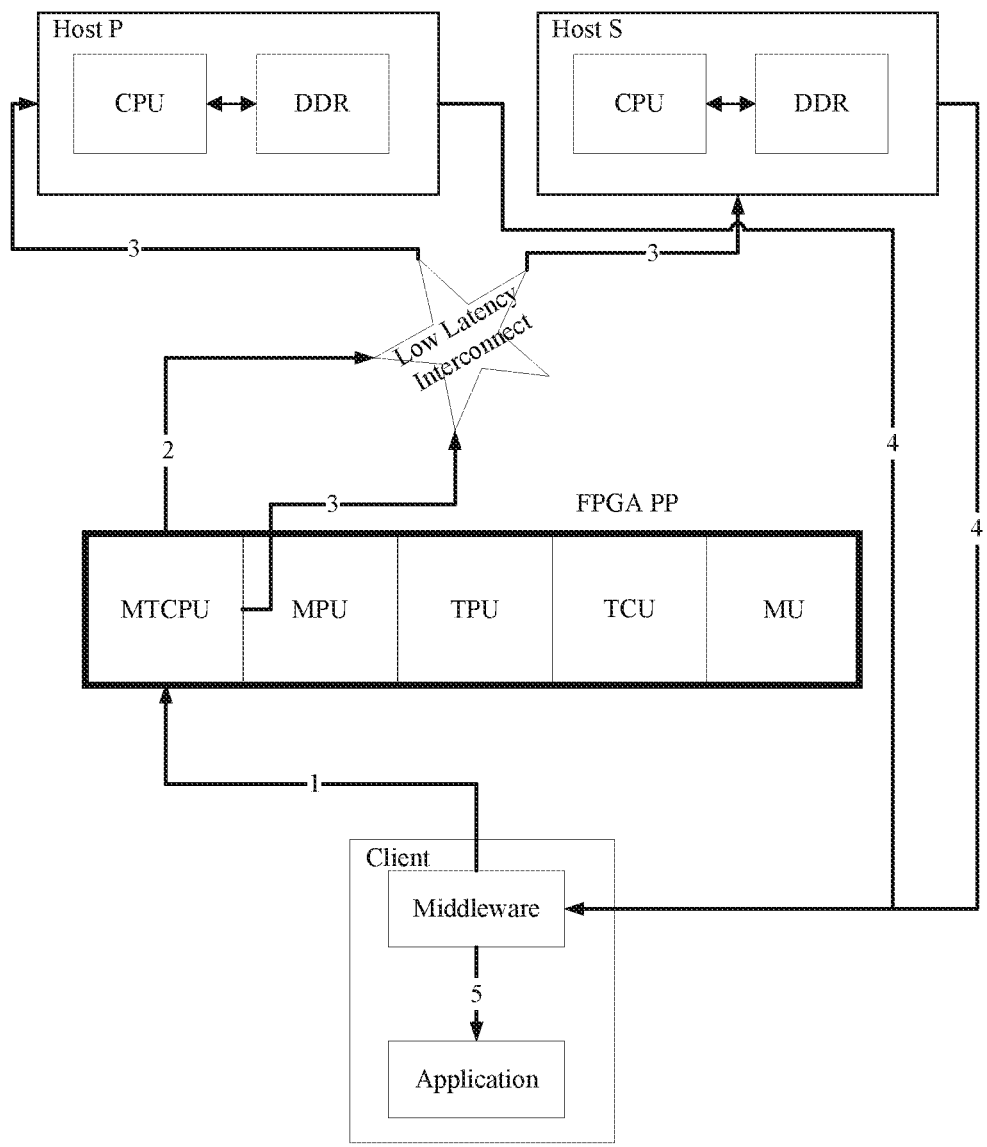
FIG. 14 is an illustration of an exemplary sequence of events when a client fails and on recovery sends an old request message which has already been committed, in accordance with an embodiment of the present disclosure.

FIG. 14 is an illustration of an exemplary sequence of events when a client fails and on recovery sends an old request message which has already been committed, in accordance with an embodiment of the present disclosure. This can happen under the following conditions
1. The primary FPGA failed just after receiving the TCP message from the client but before sending the acknowledgement back to the client.
2. The client crashed, recovered, and on recovery found that responses to some messages were not received and hence resent the request messages with outstanding responses. (These messages were sent by the system, but the client middleware was not able to save the incoming response and notifications, if any, before the client crash).
The sequence numbers indicated in the figure are illustrative of steps as mentioned below.
1. The client sends a request to the Active FPGA
2. The active FPGA copies the TCP packets corresponding to the incoming requests on to the passive FPGA and sends an acknowledgement (TCP level) back to the client (acknowledgement—not explicitly shown).
3. The MPU detects an old message. The active FPGA then sends the message to the Hosts.
4. The Hosts look up the response and pass the response directly to the client.
5. The client middleware take the first response, discard the duplicates and pass the response to the application.
The passive FPGAs are not shown in the figure. In an embodiment, the client middleware implements a timer to track the sending of requests. When a response is received, it cancels the timer. If the time expires, it attempts to resend the request and on successful resend, it re-initiates the timer. This cycle continues till a response is received. On the other hand, at the server side, it is geared to detect duplicate requests and thus will respond to it appropriately.

Figure 15:
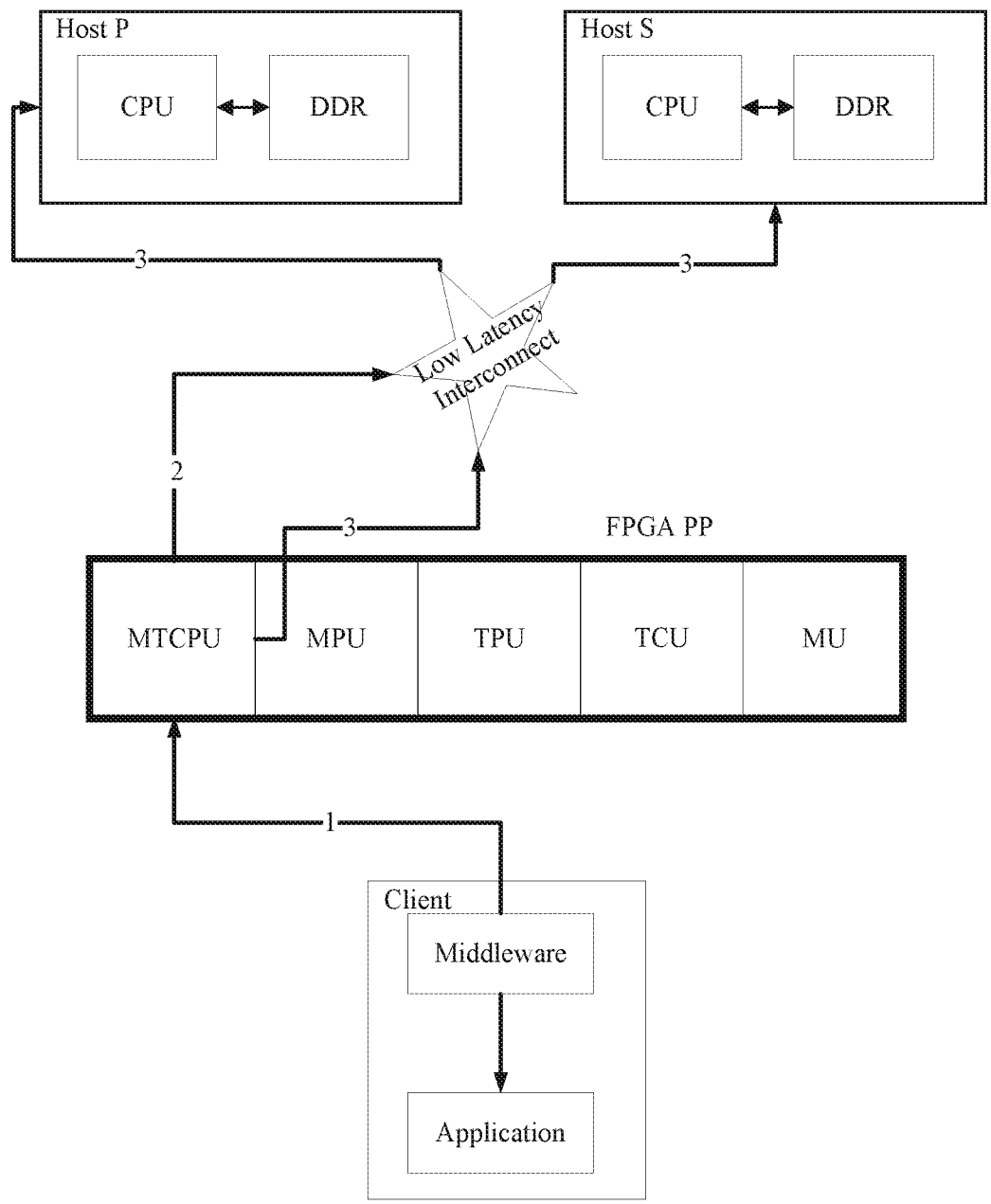
FIG. 15 is an illustration of an exemplary sequence of events when handling acknowledgements by a client, in accordance with an embodiment of the present disclosure.

FIG. 15 is an illustration of an exemplary sequence of events when handling acknowledgements by a client, in accordance with an embodiment of the present disclosure. Client acknowledgements also follow a similar flow as in FIG. 14 with the exception of step 4. The sequence numbers indicated in the figure are illustrative of steps as mentioned below.
1. The client sends a request message to the Active FPGA.
2. The active FPGA copies the TCP packets corresponding to the incoming requests on to the passive FPGA and sends an acknowledgement (TCP level) back to the client (acknowledgement—not explicitly shown).
3. The MPU detects that this is an acknowledgement message. It then sends the message to both Live_Hosts (Host P and Host S) which mark the messages as acknowledged.

Figure 16:
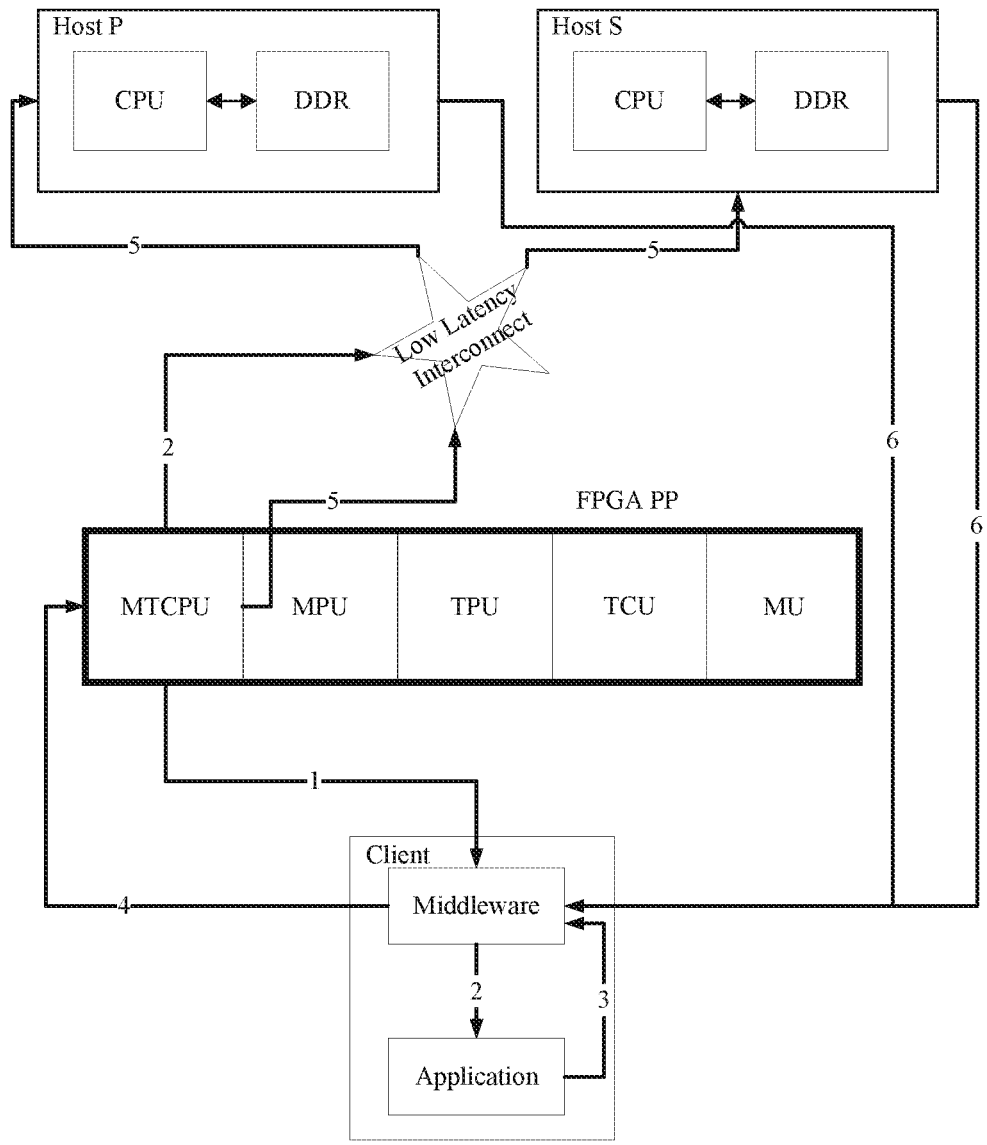
FIG. 16 is an illustration of a sequence of operations implementing exactly-once delivery of notifications to a client, in accordance with an embodiment of the present disclosure.

FIG. 16 is an illustration of a sequence of operations implementing exactly-once delivery of notifications to a client, in accordance with an embodiment of the present disclosure. The steps of the present disclosure for sending responses and receiving acknowledgements are also used to implement exactly—once delivery of notifications to the client. The difference being that it is the server side application, which initiates the notification. When the notification is committed to the Hosts by the FPGAs before sending the notification, the Hosts start a notification acknowledgement timer. If the client application does not acknowledge the receipt of the notification before this timer expires the Host resends the notification. This cycle continues till the notification is finally acknowledged by the client. After the client acknowledges the notification, the Host sends a second level acknowledgement to help the client release resources used for the notification acknowledgement. The sequence numbers indicated in the figure are illustrative of steps as mentioned below.
1. All FPGAs (only one shown in figure above) send a notification message to the client middleware.
2. The client middleware passes the notification message to the Application and discards duplicates.
3. The client application acknowledges the notification message.
4. The client middleware forwards the acknowledgement to the Active FPGA.
5. The Active FPGA forwards the acknowledgement to the Hosts.
6. The Hosts send a second level acknowledgement to enable the client middleware clean up resource used for the notification.

The client middleware communicates with the server system through TCP connections. It makes the following TCP connections with the system.
1. One connection for sending request messages to the system—from client to the active FPGA and for receiving response and notifications, if any, from the active FPGA
2. Two standby connections—one each to each passive FPGA
3. Two host connections—one per host to receive older response messages and notifications. They are also used for queries. These may also be used for receiving the response and notifications, if any, if the query traffic is reduced.

In accordance with an embodiment of the present disclosure, the framework of the present disclosure supports any kind of stateful application. In an embodiment, the requirements from the application end to use the framework are as follows:

1. At least some of the steps may be performed via one or more APIs.
2. Execution to completion—Every transaction that enters the system needs to go on to completion either until it commits or until it aborts due to deterministic program logic. In either case the application needs to generate a response back to the initiating client using the same client identifier of the request of the transaction.
3. The application processes incoming requests concurrently by implementing ordered locking. The locks need to be granted strictly in the order they were requested. If the record to be locked cannot be determined before the start of processing of the transaction, the application needs to abort the transaction and resubmit the request to the framework once it is determined using the framework's API. Once the resubmitted transaction is injected back to into the system, the execution proceeds to completion only if the values of dependent variables have not changed. Otherwise, it has to once again determine the records which it needs to lock, abort current execution of the transaction and resubmit the request. Values of non-deterministic functions may be used as provided by the framework API. When generating notifications also it should generate notifications for each client in a deterministic order. When sending notifications, the application needs to provide the API, the triggering transaction number and the sequence number (deterministically determined) of the notification generated within that triggering transaction (A transaction may generate many notifications across many clients).

Figure 17:
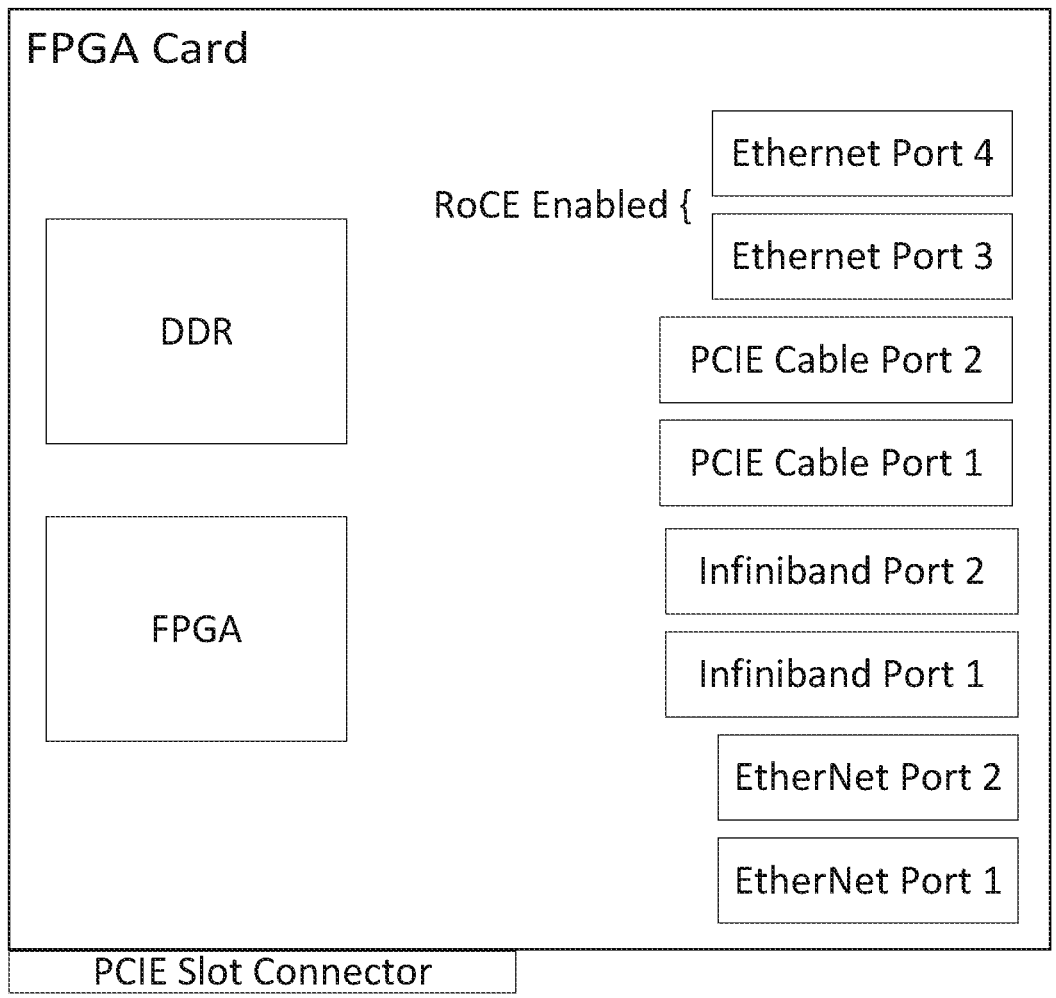
FIG. 17 is an exemplary block diagram of an FPGA card in accordance with an embodiment of the present disclosure.

FIG. 17 is an exemplary block diagram of an FPGA card in accordance with an embodiment of the present disclosure. The illustrated embodiment is designed to suit the availability, exactly-once processing and performance requirements needed by the client. A PCIE Slot connector enables the FPGA board to be inserted into a PCIE slot in the server or in a PCIE Expansion box. The Ethernet ports 1 and 2 are used for connecting to clients over TCP/IP/Ethernet. A pair of Infiniband ports, a pair of PCIE cable connector ports, and another pair of Ethernet ports is also provided. Only one pair of these ports may be used for specific implementation. The other three pairs are used for connecting the endpoints (FPGAs and Hosts).

Figure 18:
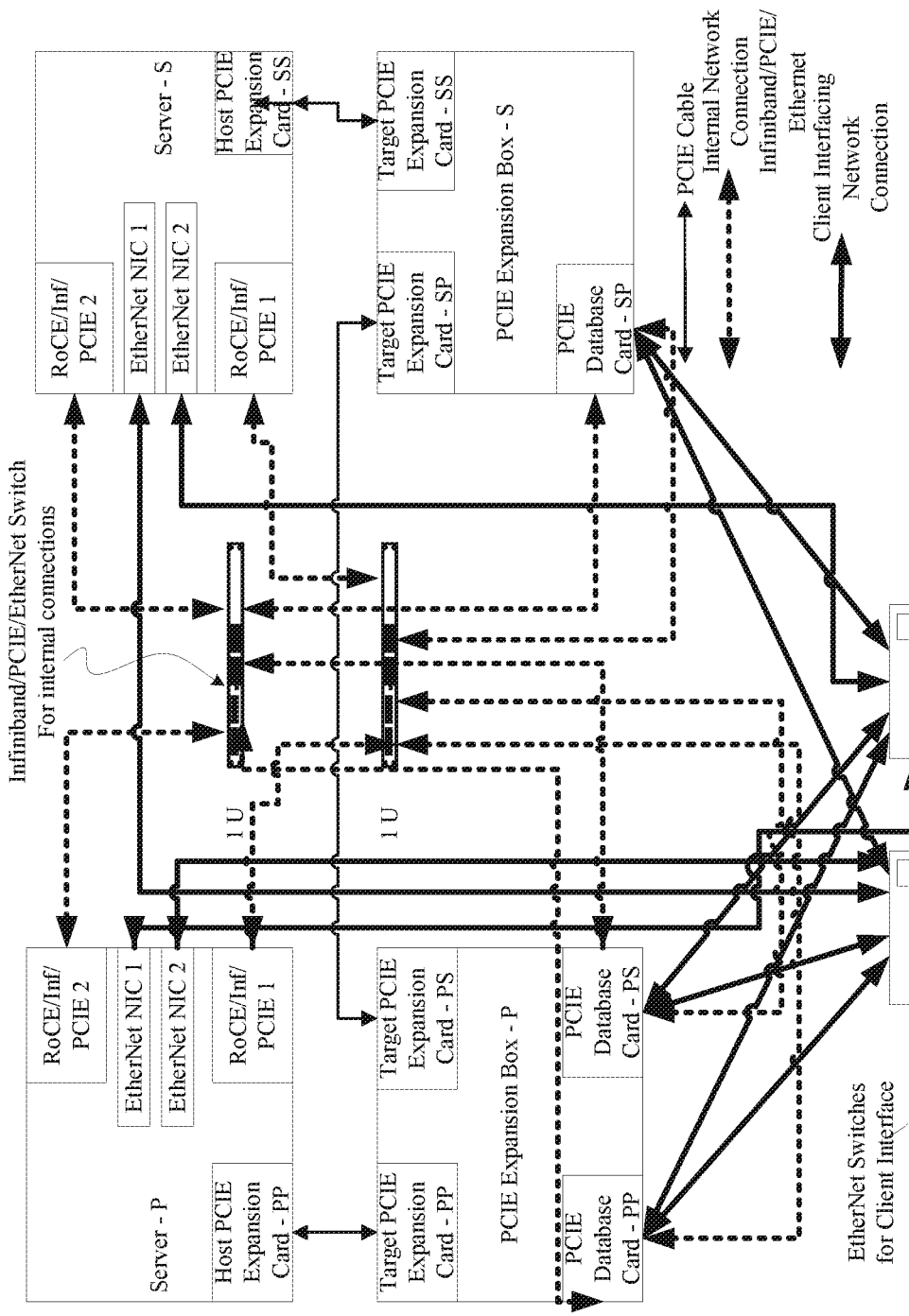
FIG. 18 is an exemplary representation of an FPGA based transaction system with 2 Hosts, 3 FPGA cards and 2 clients all with redundant network connectivity, in accordance with an embodiment of the present disclosure.

FIG. 18 is an exemplary representation of an FPGA based transaction system with 2 Hosts, 3 FPGA cards and 2 clients all with redundant network connectivity, in accordance with an embodiment of the present disclosure. There are 2 networks illustrated wherein one network is the Ethernet network, which is used to connect the clients to the server. The second network is used for communication within the server components. This network may be Infiniband, PCIE or Ethernet enabled with RoCE NiCs (RDMA over Converged Ethernet). In all the cases a PCIE network connects the FPGA cards to the Host. The FPGA cards are housed in PCIE expansion boxes having PCIE switches within them (not shown in the figure). In both networks if one network path drops between any two endpoints then the communication falls back on the other. The two networks may also be used for parallel network communication, which means further reduction in latencies. Every endpoint has 2 connections to each network it is connected to. If one of the connections fail, then another connection may be used to fall back upon. Host P is configured as the root hub for the PCIE network comprising the Host and FPGA endpoints. If it fails, Host S takes over as the root hub with no impact to the FPGA cards as this functionality is supported by the PCIE switches.

In an embodiment, in place of the exemplary FPGA card illustrated in FIG. 17, commodity hardware such as FPGA cards with 4 QSFP connection slots may be used. Each QSFP connector may connect either to an Ethernet Network (and use RoCE for communication) or an Infiniband Network, with the configuration being programmed into the FPGA. So the second network which is used to interconnect the server system components may be either Infiniband or Ethernet.

In accordance with an embodiment of the present disclosure, client middleware is implemented in software. In an embodiment, the clients themselves may be servers in case of multi-tier applications. For example, at the client for a database server may be a web server, which aggregates a certain set of end-users. In stock-exchange trading applications the clients may be gateway servers which multiplex end-users and send requests to order matching servers. Alternatively, they may be high frequency trading servers, which generate requests based on market feeds and send requests to a matching server. While the servers may be implemented as described above, the clients, which are also servers may slow down due to persistent writes by the client middleware. Such clients are also co-located with the servers themselves. In accordance with an embodiment of the present disclosure, following are the options possible in the case of such clients, which may be servers:
1. Use of high speed persistent storage technology.
2. Share the Hosts used in the server side for persistence of messages in the same way the FPGAs on the server side persisted transactions and notifications. This requires that the Hosts have enough resources to serve additional workload without slowing down any operation.
3. Have a separate set of Hosts for persisting messages as opposed to sharing with the hosts as in point 2 above.

In an embodiment, the clients themselves may be implemented on the FPGAs, wherein the client side middleware may also be implemented on FPGAs.

In accordance with the present disclosure, the main function of the Hosts include:
1. Function as root complex in the PCIE network, wherein the Host CPUs act as root complexes.
2. Provide a means of buffering transaction data over larger periods as they have larger memory.
3. Persist transactions and notifications into storage for retrieval later.

Figure 19A:
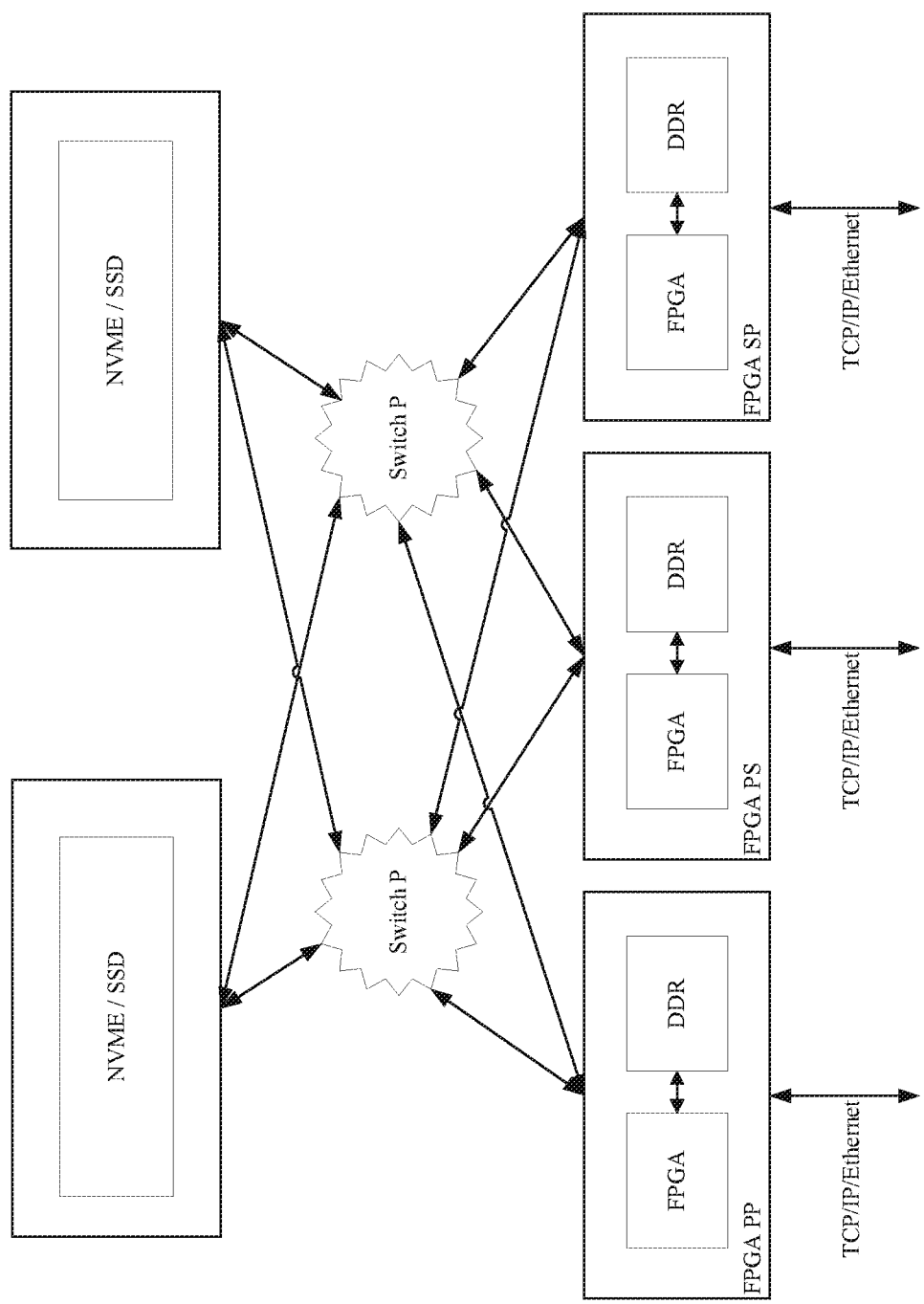
FIG. 19A is an exemplary high level representation of an FPGA based transaction system without Hosts in accordance with an embodiment of the present disclosure.
Figure 19B:
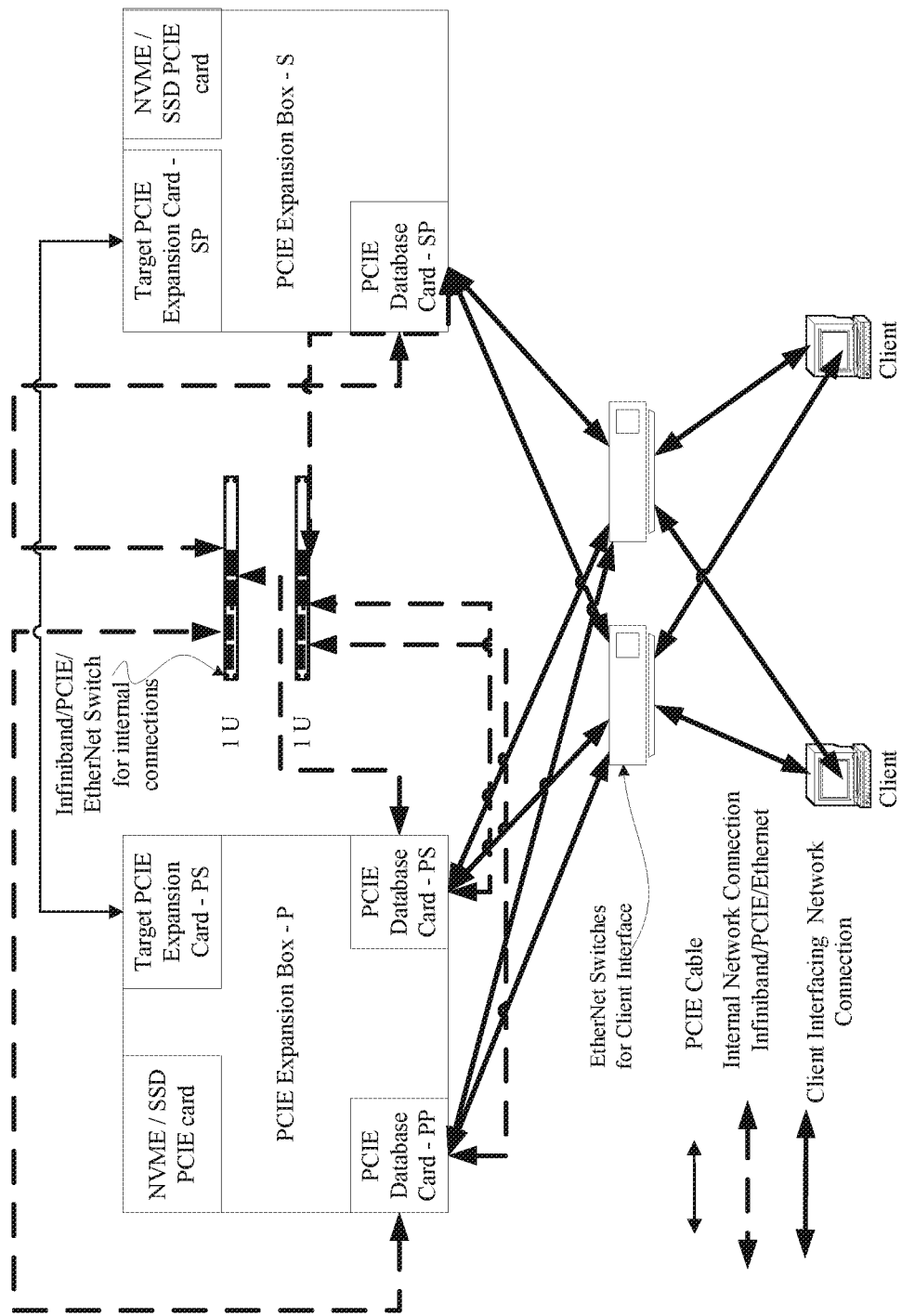
FIG. 19B is an exemplary detailed representation of the FPGA based transaction system without Hosts of FIG. 19A.

In accordance with an embodiment of the present disclosure, as illustrated in FIG. 2B, the system 200 includes only FPGAs that serve the functions of the Hosts as explained earlier and with reference to system 100. The FPGA may be configured to take over as the root complex thereby eliminating need for a Host. FPGA cards may be configured with high memory and if the application requirements can be met by the available memory then need for a Host may be eliminated. Also, storage in the form of Non-Volatile Memory Express (NVME) available as a PCIE card may be connected to a PCIE network which means that the FPGA card may communicate to it directly again eliminating need for a Host. Another reason to eliminate the Host may be because FPGA themselves have CPU cores fabricated within them. FIG. 19A is an exemplary high level representation of an FPGA based transaction system without Hosts in accordance with an embodiment of the present disclosure and FIG. 19B is an exemplary detailed representation of the FPGA based transaction system without Hosts of FIG. 19A. It may be noted that the system design and construction is simplified without the need for Hosts. In accordance with the illustrated embodiment, the active FPGA may be take up the added role of the active Host and the passive FPGA may take up the added role of the passive Host without loss of functionality.

In accordance with the present disclosure, for both the embodiments with Hosts or with no Hosts, it may be noted that increasing redundancy increases availability. Within permissive costs it desirable to have as large a value of M (M+1 redundancy) as possible. (There will be two values of M required for a 'with hosts' construction—one for FPGAs and one for Hosts. A low setting of the mode switching factor K tends to place high priority to exactly-once conservative mode behavior, while with a high value of K the system tends to the high performance mode behavior.

In an embodiment of the present disclosure, a backup power supply with a stored energy reserve may be provided for use in the event that main power supply to the FPGA based transaction system fails. With the availability of reliable backup supply such as a battery, the value of K may be set to M. In such a configuration, the system delivers high performance while supporting exactly-once transaction semantics.

It may be noted that increasing the value of M increases communication requirements. Request and response messages are being replicated by a publish-subscribe mechanism. As M increases, the number of subscribers increases and causes higher communication overheads which may affect the latencies. Because the FPGA implementation uses a lot of parallel resources this overhead is a minimum (compared to software platforms) and may be negligible for slightly low to medium values of M. Another source of bottleneck for publish-subscribe may be the limited number of physical ports for communication. Ideally, there needs to be M ports. This bottleneck may be overcome with the use PCIE DMA multicast feature available in the switches. The hardware constructions described earlier may be easily extended to support larger values of M, given switches with larger number of ports for PCIE, Infiniband or RoCE networks. In accordance with an embodiment of the present disclosure, FPGA cards may be hosted in as many PCIE Expansion boxes available to achieve maximum availability with power isolation.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A Field Programmable Gate Array (FPGA) based transaction system (100) comprising: a plurality of FPGAs including an active FPGA and remaining passive FPGAs, each of the plurality of FPGAs being configured to cooperate with a plurality of Hosts and at least one client, the plurality of FPGAs being connected to the at least one client via a Transmission Control Protocol (TCP) connection, each of the plurality of FPGAs having a volatile memory, the plurality of FPGAs comprising:
- a Modified Transmission Control Protocol Unit (MTCPU) configured to:
  - receive TCP packets corresponding to incoming requests, by the MTCPU of the active FPGA, from the at least one client;
  - append the TCP packets, with at least a time-stamp as a non-deterministic parameter;
  - publish the TCP packets, by the MTCPU of the active FPGA, to the passive FPGAs, and thereafter transmit a TCP acknowledgement of the incoming requests to the at least one client after an internal acknowledgement of receipt of the TCP packets by the passive FPGAs;
  - control, by the MTCPU of the active FPGA, scheduling of the incoming requests along with resubmitted requests caused by concurrent execution by an application after a configurable delay, wherein the resubmitted requests are prioritized over the incoming requests; and
  - optimize performance by preparing TCP packets corresponding to (a) a response or (b) the response and one or more notifications and transmitting the prepared TCP packets to the at least one client upon receipt of an internal acknowledgement from the plurality of Hosts;
- a Message Parsing Unit (MPU) configured to:
  - detect, by the MPU of the active FPGA, duplicate requests received based on associated request identifiers;
  - retrieve, by the MPU of the active FPGA, the resubmitted requests based on an associated client identifier and an associated request identifier; and
  - parse and convert the TCP packets received in a sequence from the MTCPU into a message format associated with a network between the at least one client and the plurality of FPGAs and the plurality of Hosts and transmit the incoming requests in the message format in the sequence;
- a Transaction Processing Unit (TPU) configured to:
  - host the application which processes the incoming requests or the resubmitted requests from the MPU and generates (a) the response or (b) the response and the one or more notifications associated thereof; and
  - receive the resubmitted requests caused by the concurrent execution from the application and send to the MTCPU for scheduling via the MPU;
- a Transaction Commit Unit (TCU) configured to:
  - receive (a) the response or (b) the response and the one or more notifications from the TPU;
  - generate messages comprising the incoming requests or the resubmitted requests and (a) the response or (b) the response and the one or more notifications; and
  - transmit the messages to (i) the plurality of Hosts for performing at least one of commit and transmit to the at least one client and (ii) the MTCPU for optimizing the performance, wherein the prepared TCP packets constitute (a) at least a portion of a message or (b) one or more of the messages; and
- a Monitoring Unit (MU) configured to:
  - monitor and initiate an FPGA failover process in the event an active FPGA failure is detected.

2. The FPGA based transaction system of claim 1, wherein the plurality of Hosts including an active Host and remaining passive Hosts are comprised in the FPGA based transaction system, each of the plurality of Hosts having a volatile memory and a non-volatile memory implemented as a key-value store and connected with the at least one client via a TCP connection, the plurality of Hosts being configured to:
- switch a mode of operation of the FPGA based transaction system between a high performance mode of operation and a conservative mode of operation based on a pre-configured mode switching threshold depending on number of available Hosts in the plurality of Hosts, wherein (i) the high performance mode involves saving the messages in the volatile memory associated with each of the plurality of Hosts and thereafter transmitting an internal acknowledgement thereof to a corresponding FPGA in the plurality of FPGAs, and (ii) the conservative mode involves saving the messages in the non-volatile memory associated with each of the plurality of Hosts and thereafter transmitting an internal acknowledgement thereof to a corresponding FPGA in the plurality of FPGAs;
- save the messages from the volatile memory into the non-volatile memory during a switching period when the high performance mode of operation switches to a conservative mode of operation;
- delay transmit of (a) the response or (b) the response and the one or more notifications to the at least one client, till the end of saving of the messages into the non-volatile memory during the switching period or based on a pre-configured time delay to ensure an incoming request is received by the plurality of Hosts instead of an associated duplicate request that reaches the plurality of Hosts prior to the incoming request; and
- delay transmit of the internal acknowledgement to the plurality of FPGAs, till the end of saving of the messages into the non-volatile memory.

3. The FPGA based transaction system of claim 2,
- wherein each of the incoming requests is tagged with a client identifier and a request identifier, wherein the request identifier is a unique sequence number incremented for every subsequent incoming request by a middleware associated with the at least one client;
- wherein a corresponding response is tagged with the request identifier;
- wherein an incoming request and a corresponding response represent a transaction; and
- wherein a notification corresponding to the incoming request is tagged with a notification identifier comprising the associated client identifier, the associated request identifier and a sequence number of the notification within the transaction.

4. The FPGA based transaction system of claim 3,
- wherein the MU comprised in the active FPGA is configured to initiate heartbeat requests to the passive FPGAs and the plurality of Hosts in the absence of internal messages between the plurality of Hosts and the plurality of FPGAs within a preset heartbeat threshold that otherwise serve as a heartbeat indicating live FPGAs and live Hosts within the plurality of FPGAs and the plurality of Hosts respectively;
- wherein the active Host is configured to serve as a monitoring server and initiates a heartbeat request to the passive Hosts and the passive FPGAs and broadcasts a list of the live FPGAs and the live Hosts to each of the plurality of FPGAs and each of the plurality of Hosts, and is further configured to initiate an FPGA failover process to a next passive FPGA if (i) the at least one client triggers the FPGA failover process via the passive FPGAs or (ii) the monitoring server does not receive a heartbeat request from the active FPGA within the preset heartbeat threshold indicating failure thereof, wherein the next passive FPGA from a predetermined sequence of the plurality of FPGAs and that is broadcasted in the list of live FPGAs and live Hosts is identified as the next active FPGA; and wherein each of the remaining passive Hosts are configured to initiate a Host failover process to convert itself into an active Host if any of the passive Hosts does not receive the heartbeat request from the active Host within the preset heartbeat threshold indicating failure thereof, wherein the passive Host from a pre-determined sequence of the plurality of Hosts and that is broadcasted in the list of live FPGAs and live Hosts is identified as the next active Host.

5. The FPGA based transaction system of claim 4, wherein the plurality of FPGAs and the plurality of Hosts are connected over either (i) a Peripheral Component Interconnect Express (PCIE) network, (ii) a combination of PCIE and Infiniband network, or (iii) a combination of Remote Direct Memory Access (RDMA) over Converged Ethernet (RoCE) network and Infiniband network.

6. A Field Programmable Gate Array (FPGA) based transaction system (200) comprising: a plurality of FPGAs including an active FPGA and remaining passive FPGAs, each of the plurality of FPGAs being configured to cooperate with at least one client via a Transmission Control Protocol (TCP) connection, each of the plurality of FPGAs having one or more storage devices being a combination of a volatile memory and a non-volatile memory and implemented as a key-value store, the plurality of FPGAs comprising:

a Modified Transmission Control Protocol Unit (MTCPU) configured to:
  receive TCP packets corresponding to incoming requests, by the MTCPU of the active FPGA, from the at least one client;
  append the TCP packets, with at least a time-stamp as a non-deterministic parameter;
  publish the TCP packets, by the MTCPU of the active FPGA, to the passive FPGAs, and thereafter transmit a TCP acknowledgement of the incoming requests to the at least one client;
  control, by the MTCPU of the active FPGA, scheduling of the incoming requests along with resubmitted requests caused by concurrent execution by an application after a configurable delay, wherein the resubmitted requests are prioritized over the incoming requests; and
  transmitting (a) a response or (b) the response and one or more notifications to the at least one client;

a Message Parsing Unit (MPU) configured to:
  detect, by the MPU of the active FPGA, duplicate requests received based on associated request identifiers;
  retrieve, by the MPU of the active FPGA, the resubmitted requests based on an associated client identifier and an associated request identifier; and
  parse and convert the TCP packets received in a sequence from the MTCPU into a message format associated with a network between the at least one client and the plurality of FPGAs;

a Transaction Processing Unit (TPU) configured to:
  host the application which processes the incoming requests or the resubmitted requests from the MPU and generates (a) the response or (b) the response and the one or more notifications; and
  receive the resubmitted requests caused by the concurrent execution from the application and send to the MTCPU for scheduling via the MPU;

a Transaction Commit Unit (TCU) configured to:
  receive (a) the response or (b) the response and the one or more notifications sent from the TPU;
  generate messages comprising the incoming requests or the resubmitted requests and (a) the response or (b) the response and the one or more notifications, wherein the TCP packets constitute (a) at least a portion of a message or (b) one or more of the messages; and
  transmit the messages to the MTCPU; and a Monitoring Unit (MU) configured to:
  monitor and initiate an FPGA failover process in the event an active FPGA failure is detected.

7. The FPGA based transaction system of claim 6, wherein the plurality of FPGAs are further configured to:
  switch a mode of operation of the FPGA based transaction system between a high performance mode of operation and a conservative mode of operation based on a pre-configured mode switching threshold depending on number of available FPGAs in the plurality of FPGAs, wherein (i) the high performance mode involves saving the messages in the volatile memory associated with each of the plurality of FPGAs and thereafter transmitting a TCP acknowledgement to the at least one client, and (ii) the conservative mode involves saving the messages in the non-volatile memory associated with each of the plurality of FPGAs and thereafter transmitting a TCP acknowledgement to the at least one client;
  save the messages from the volatile memory into the non-volatile memory during a switching period when the high performance mode of operation switches to a conservative mode of operation; and
  delay transmit of (a) the response or (b) the response and the one or more notifications to the at least one client, till the end of saving of the messages into the non-volatile memory.

8. The FPGA based transaction system of claim 7, wherein each of the incoming requests is tagged with a client identifier and a request identifier, wherein the request identifier is a unique sequence number incremented for every subsequent incoming request by a middleware associated with the at least one client;
wherein a corresponding response is tagged with the request identifier;
wherein an incoming request and a corresponding response represent a transaction; and
wherein a notification corresponding to the incoming request is tagged with a notification identifier comprising the associated client identifier, the associated request identifier and a sequence number of the notification within the transaction.

9. The FPGA based transaction system of claim 8, wherein the MU, comprised in the active FPGA serving as a monitoring server, is configured to initiate heartbeat requests to the passive FPGAs in the absence of internal messages between the passive FPGAs and the active FPGA within a preset heartbeat threshold that otherwise serve as heartbeats indicating live FPGAs within the plurality of FPGAs, the MU comprised in the active FPGA is further configured to broadcast a list of the live FPGAs to each of the plurality of FPGAs; and and wherein the MU comprised in each of the passive FGPAs is configured to initiate an FPGA failover process to convert itself into an active FPGA if (i) any of the passive FPGAs do not receive the heartbeat request from the active FPGA within the preset heartbeat threshold indicating failure thereof, wherein a passive FPGA from a pre-determined sequence of the plurality of FPGAs and that is broadcasted in the list of live FPGAs is identified as the next active FPGA or (ii) the at least one client triggers the FPGA failover process via the passive FPGAs.

10. The FPGA based transaction system of claim 9, wherein the plurality of FPGAs are connected over either (i) a Peripheral Component Interconnect Express (PCIE) network, (ii) a combination of PCIE and Infiniband network, or (iii) a combination of Remote Direct Memory Access (RDMA) over Converged Ethernet (RoCE) network and Infiniband network.

11. A method (300) comprising:
establishing a Transmission Control Protocol (TCP) connection from at least one client to each Field Programmable Gate Array (FPGA) and each Host in an FPGA based transaction system comprising a plurality of FPGAs, a plurality of Hosts and at least one client with messages transmitted therebetween, wherein each of the messages comprise an incoming request from the at least one client and (a) a response or (b) the response and one or more notifications associated thereof, to the at least one client, and wherein an incoming request and a corresponding response represents a transaction (302);
switching a mode of operation of the FPGA based transaction system between a high performance mode of operation and a conservative mode of operation based on a pre-configured mode switching threshold depending on number of available Hosts in the plurality of Hosts, wherein (i) the high performance mode involves saving the messages in a volatile memory associated with each of the plurality of Hosts and thereafter transmitting an internal acknowledgement thereof to a corresponding FPGA in the plurality of FPGAs, and (ii) the conservative mode involves saving the messages in a non-volatile memory associated with each of the plurality of Hosts and thereafter transmitting an internal acknowledgement thereof to a corresponding FPGA in the plurality of FPGAs (304);
saving the messages from the volatile memory into the non-volatile memory of the plurality of Hosts during a switching period when the high performance mode of operation switches to a conservative mode of operation (306);
delaying transmitting of (a) the response or (b) the response and the one or more notifications to the at least one client, till the end of saving of the associated messages into the non-volatile memory during the switching period or based on a pre-configured time delay to ensure an incoming request is received by the plurality of Hosts instead of an associated duplicate request that reaches the plurality of Hosts prior to the incoming request (308); and
delaying transmitting of the internal acknowledgement to the plurality of FPGAs, till the end of saving of the associated messages into the non-volatile memory (310).

12. The method of claim 11, wherein the volatile and non-volatile memory of the plurality of Hosts are implemented as a key-value store and wherein each of the incoming requests is tagged with a client identifier and a request identifier, wherein the request identifier is a unique sequence number incremented for every subsequent incoming request by a middleware associated with the at least one client;
a corresponding response is tagged with the request identifier;
an incoming request and a corresponding response represent a transaction; and
a notification corresponding to the incoming request is tagged with a notification identifier comprising the associated client identifier, the associated request identifier and a sequence number of the notification within the transaction.

13. The method of claim 12, further comprising detecting, by the plurality of FPGAs, all duplicate requests from the at least one client (312) by:
appending a list of request identifiers, in each of the plurality of FPGAs, associated with incoming requests being processed in the plurality of FPGAs for every incoming request not available in the list and if the associated sequence number is greater than a maximum sequence number received from the corresponding client;
discarding an incoming request if an associated request identifier is available in the list;
obtaining, from an application, the at least one of (a) a response or (b) one or more notifications corresponding to the incoming request if an associated request identifier is not available in the list;
transmitting, to the plurality of Hosts, (a) the response or (b) the response and the one or more notifications and deleting an associated request identifier from the list;
storing a message comprising the incoming requests or the resubmitted request along with (a) the response or (b) the response and the one or more notifications associated thereof in an appropriate key-value store in the plurality of Hosts depending on the mode of operation;
transmitting (a) the response or (b) the response and the one or more notifications from either the volatile or the non-volatile memory of the plurality of Hosts to the at least one client, if an associated request identifier is not available in the list of request identifiers and if the associated sequence number is less than the maximum sequence number received from the corresponding client, thereby detecting, by the plurality of FPGAs, the incoming request as a duplicate request; and
deleting the message from the volatile memory and saving in the non-volatile memory of the plurality of Hosts upon receipt of an acknowledgement pertaining to consuming (a) the response or (b) the response and the one or more notifications by a corresponding client.

14. The method of claim 11, further comprising transmitting the one or more notifications to the at least one client with exactly-once semantics by retransmitting the one or more notifications if an acknowledgement pertaining to receipt of the notification is not received within a pre-configured time from the at least one client (314).

15. The method of claim 13, further comprising providing high availability for the transaction system (316) by:
identifying one of the plurality of FPGAs as an active FPGA and one of the plurality of Hosts as an active Host, remaining FPGAs from the plurality of FPGAs and remaining Hosts from the plurality of Hosts being identified as passive FPGAs and passive Hosts respectively to achieve redundancy;

initiating heartbeat requests, by the active FPGA, to each of the passive FPGAs and the plurality of Hosts in the absence of internal messages between the plurality of Hosts and the plurality of FPGAs within a preset heartbeat threshold that otherwise serve as a heartbeat indicating live FPGAs and live Hosts within the plurality of FPGAs and the plurality of Hosts respectively;

initiating heartbeat requests, by the active Host serving as a monitoring server, to the passive Hosts and the passive FPGAs;

broadcasting, by the monitoring server, a list of the live FPGAs and the live Hosts to each of the plurality of FPGAs and each of the plurality of Hosts based on a status of the heartbeat requests;

initiating an FPGA failover process to a next passive FPGA in the event that (i) the at least one client triggers the FPGA failover process via the passive FPGAs or (ii) a heartbeat request is not received by the monitoring server within the pre-set heartbeat threshold from the active FPGA indicating failure thereof, wherein the next passive FPGA from a pre-determined sequence of the plurality of FPGAs and that is broadcasted in the list of live FPGAs and live Hosts is identified as the next active FPGA;

initiating a Host failover process, by a passive Host from a pre-determined sequence of the plurality of Hosts, in the event that any of the passive Hosts do not receive a heartbeat request within the pre-set heartbeat threshold from the active Host indicating failure thereof, and further identifying the passive Host from the pre-determined sequence of the plurality of Hosts and that is broadcasted in the list of live FPGAs and live Hosts as the next active Host;

broadcasting, by the active FPGA or the monitoring server, the next active FPGA or the next active Host to each of the live FPGAs, the live Hosts and the at least one client after completion of the FPGA failover process or the Host failover process respectively; and terminating wait for an internal acknowledgement or the messages pertaining to failure of additional Hosts and FPGAs based on the list of live hosts and live FPGAs sent by the monitoring server, determined using heartbeats.

16. The method of claim 15, further comprising providing deterministic execution of each transaction (318) by:

appending TCP packets corresponding to the incoming requests, with at least a time-stamp as a non-deterministic parameter, wherein the TCP packets constitute (a) at least a portion of a message or (b) one or more of the messages;

publishing the TCP packets, by the active FPGA, to the passive FPGAs, and thereafter transmitting an TCP acknowledgment of the incoming requests to the at least one client after internal acknowledgement of receipt of the TCP packets by the passive FPGAs;

receiving the resubmitted requests, in the active FPGA, caused by concurrent execution by an application;

publishing, by the active FPGA, only the request identifiers with the non-deterministic parameter for the resubmitted requests to the passive FPGAs;

storing the resubmitted requests as a key-value store in the volatile memory of the plurality of FPGAs; and scheduling execution of the incoming requests along with the resubmitted requests after a configurable delay by prioritizing the resubmitted requests over the incoming requests, in the active FPGA.

17. The method of claim 16, further comprising maintaining consistent states across the plurality of FPGAs and the plurality of Hosts during active FPGA failover (320) by performing one or more of:

parsing all the TCP packets received from the active FPGA by the plurality of FPGAs;

discarding incomplete messages by the plurality of FPGAs;

comparing the number of TCP packets received by the passive FPGAs and the active FPGA and copying missing TCP packets from the active FPGA to the passive FPGAs; and processing the resubmitted messages in the plurality of FPGAs.

* * * * *